(12) United States Patent
Day

(10) Patent No.: US 9,459,734 B2
(45) Date of Patent: Oct. 4, 2016

(54) INPUT DEVICE WITH DEFLECTABLE ELECTRODE

(75) Inventor: Shawn P. Day, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 1386 days.

(21) Appl. No.: 12/749,946

(22) Filed: Mar. 30, 2010

(65) Prior Publication Data

US 2010/0253651 A1 Oct. 7, 2010

Related U.S. Application Data

(60) Provisional application No. 61/167,058, filed on Apr. 6, 2009.

(51) Int. Cl.
*G06F 3/042* (2006.01)
*G06F 3/044* (2006.01)

(52) U.S. Cl.
CPC ...................... *G06F 3/044* (2013.01)

(58) Field of Classification Search
CPC ................. G06F 3/041; G06F 3/044
USPC ......................... 345/173, 174, 175
See application file for complete search history.

(56) References Cited

U.S. PATENT DOCUMENTS

| | | | |
|---|---|---|---|
| 5,510,813 A | 4/1996 | Makinwa et al. | |
| 5,543,590 A | 8/1996 | Gillespie et al. | |
| 5,812,357 A | 9/1998 | Johansen et al. | |
| 5,854,625 A | 12/1998 | Frisch | |
| 5,942,733 A * | 8/1999 | Allen | G06K 9/00335 178/18.01 |
| 5,945,594 A | 8/1999 | Kendig et al. | |
| 5,945,733 A * | 8/1999 | Corbett et al. | 257/676 |
| 5,945,980 A | 8/1999 | Moissev et al. | |
| 6,002,389 A | 12/1999 | Kasser | |
| 6,215,476 B1 | 4/2001 | Depew et al. | |
| 6,239,790 B1 | 5/2001 | Martinelli et al. | |
| 6,555,235 B1 | 4/2003 | Aufderheide et al. | |
| 6,642,857 B1 | 11/2003 | Schediwy et al. | |
| 6,819,316 B2 | 11/2004 | Schulz et al. | |
| 6,888,537 B2 | 5/2005 | Benson et al. | |

(Continued)

FOREIGN PATENT DOCUMENTS

WO 9718528 5/1997

OTHER PUBLICATIONS

International Search Report PCT/US2010/037279 dated Dec. 27, 2010.

(Continued)

*Primary Examiner* — Nicholas Lee
(74) *Attorney, Agent, or Firm* — Osha Liang LLP

(57) ABSTRACT

Devices and methods are provided that facilitate improved input device performance. The devices and methods utilize a set of sensor electrodes comprising at least one transmitter sensor electrode and at least one receiver sensor electrode that are capacitively coupled to form a transcapacitance for capacitively sensing input objects in a sensing region. A measure of the transcapacitance may be used to determine positional information for the input objects in the sensing region. In accordance with the various embodiments, the devices and methods additionally utilize at least one deflectable electrode, where the deflectable electrode is electrically floating. The deflectable electrode is configured to be deflectable toward the set of sensor electrodes, where the deflection causes a change in the transcapacitance.

34 Claims, 11 Drawing Sheets

(56) References Cited

U.S. PATENT DOCUMENTS

| | | |
|---|---|---|
| 7,148,882 B2 | 12/2006 | Kamrath et al. |
| 7,154,481 B2 | 12/2006 | Cross et al. |
| 7,260,999 B2 | 8/2007 | Divigalpithiya et al. |
| 7,663,607 B2 | 2/2010 | Hotelling et al. |
| 7,764,071 B2 | 7/2010 | Thibedeau et al. |
| 8,058,884 B2 * | 11/2011 | Betancourt .................... 324/686 |
| 8,466,858 B2 * | 6/2013 | Govil ............................ 345/85 |
| 2003/0234770 A1 * | 12/2003 | MacKey ....................... 345/173 |
| 2005/0052425 A1 | 3/2005 | Zadesky et al. |
| 2006/0170659 A1 | 8/2006 | Yamamoto et al. |
| 2006/0209039 A1 | 9/2006 | Destura et al. |
| 2007/0198926 A1 | 8/2007 | Joguet et al. |
| 2008/0006453 A1 * | 1/2008 | Hotelling ............... G06F 3/044 178/18.06 |
| 2008/0007539 A1 | 1/2008 | Hotelling |
| 2008/0165139 A1 | 7/2008 | Hotelling et al. |
| 2008/0245582 A1 | 10/2008 | Bytheway |
| 2008/0309634 A1 | 12/2008 | Hotelling |
| 2009/0020343 A1 | 1/2009 | Rothkopf et al. |
| 2009/0077798 A1 | 3/2009 | Hirai et al. |
| 2009/0213090 A1 * | 8/2009 | Mamba et al. ............... 345/174 |
| 2009/0256817 A1 | 10/2009 | Perlin et al. |
| 2009/0273573 A1 | 11/2009 | Hotelling |
| 2010/0013785 A1 | 1/2010 | Murai et al. |
| 2010/0141591 A1 * | 6/2010 | Lin ............................... 345/173 |
| 2010/0265212 A1 | 10/2010 | Sekiguchi et al. |

OTHER PUBLICATIONS

International Search Report PCT/US2010/029963 dated Nov. 17, 2010.

United States Patent and Trademark Office, U.S. Non-final Office Action dated Jan. 11, 2013 for U.S. Appl. No. 12/792,578.

USPTO, Non-Final Office Action issued in U.S. Appl. No. 12/792,578, mailed Jun. 20, 2013.

* cited by examiner

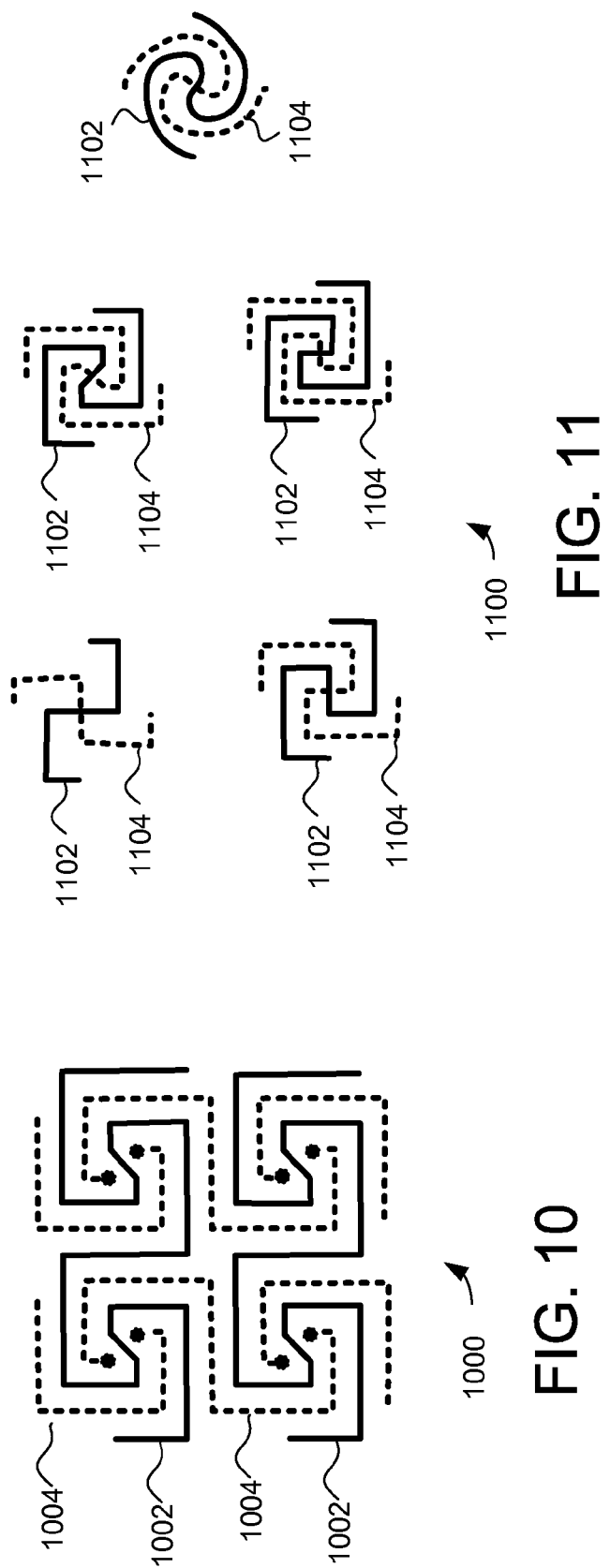

INPUT DEVICE WITH DEFLECTABLE ELECTRODE

PRIORITY DATA

This application claims priority of U.S. Provisional Patent Application Ser. No. 61/167,058, which was filed on Apr. 6, 2009, and is incorporated herein by reference.

FIELD OF THE INVENTION

This invention generally relates to electronic devices, and more specifically relates to input devices, such as proximity sensor devices.

BACKGROUND OF THE INVENTION

Proximity sensor devices (also commonly called touchpads or touch sensor devices) are widely used in a variety of electronic systems. A proximity sensor device typically includes a sensing region, often demarked by a surface, which uses capacitive, resistive, inductive, optical, acoustic and/or other technology to determine the presence, location and/or motion of one or more fingers, styli, and/or other objects. The proximity sensor device, together with finger(s) and/or other object(s), may be used to provide an input to the electronic system. For example, proximity sensor devices are used as input devices for larger computing systems, such as those found integral within notebook computers or peripheral to desktop computers. Proximity sensor devices are also used in smaller systems, including handheld systems such as personal digital assistants (PDAs), remote controls, digital cameras, video cameras, communication systems such as wireless telephones and text messaging systems. Increasingly, proximity sensor devices are used in media systems, such as CD, DVD, MP3, video or other media recorders or players.

Many electronic devices include a user interface (UI) and an input device for interacting with the UI (e.g., interface navigation). A typical UI includes a screen for displaying graphical and/or textual elements. The increasing use of this type of UI has led to a rising demand for proximity sensor devices as pointing devices. In these applications the proximity sensor device may function as a value adjustment device, cursor control device, selection device, scrolling device, graphics/character/handwriting input device, menu navigation device, gaming input device, button input device, keyboard and/or other input device.

There is a continuing need for improvements in input devices. In particular, there is a continuing need for improvements in the performance, functionality and usability of proximity sensors as input devices in UI applications.

BRIEF SUMMARY OF THE INVENTION

Devices and methods are provided that facilitate improved input device performance. The devices and methods utilize at least one transmitter sensor electrode and at least one receiver sensor electrode that are capacitively coupled to form a transcapacitance for capacitively sensing input objects in a sensing region. A measure of the transcapacitance may be used to determine positional information for the input objects in the sensing region. In accordance with the various embodiments, the devices and methods additionally utilize at least one deflectable electrode, where the deflectable electrode is electrically floating (i.e. ohmically insulated from other electrical elements). The deflectable electrode is configured to be mechanically deflectable toward the sensor electrodes, where deflection of the deflectable electrode toward the sensor electrodes causes a change in the measured transcapacitance.

In one embodiment, one or more deflectable electrodes are configured to be overlapping at least a portion of one or more transmitter sensor electrodes or at least a portion of one or more receiver sensor electrodes. In another embodiment, one or more deflectable electrodes are disposed on the surface of a substrate.

The devices and methods may use the deflectable electrode in a variety of ways that facilitate improved input device performance and usefulness. Specifically, the change in the measured transcapacitance resulting from a deflectable electrode can be used to determine information regarding an input object. As one specific example, a magnitude of change in the measure of the transcapacitance may be used to determine pressure information for an input object causing deflection of one or more deflectable electrodes. As another example, the sign of the change in the measure of transcapacitance may be used to determine the type of input object, such as to distinguish between conductive and non-conductive input objects. The pressure information and/or object type information may then be used as part of determining the user input being indicated by one or more input objects.

Thus, the various embodiments provide improved input device performance by facilitating the determination of position information along with pressure information and/or type information for one or more input objects.

BRIEF DESCRIPTION OF DRAWINGS

The preferred exemplary embodiment of the present invention will hereinafter be described in conjunction with the appended drawings, where like designations denote like elements, and:

FIGS. 2-12 are diagrams of parts of input devices in accordance with embodiments of the invention.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
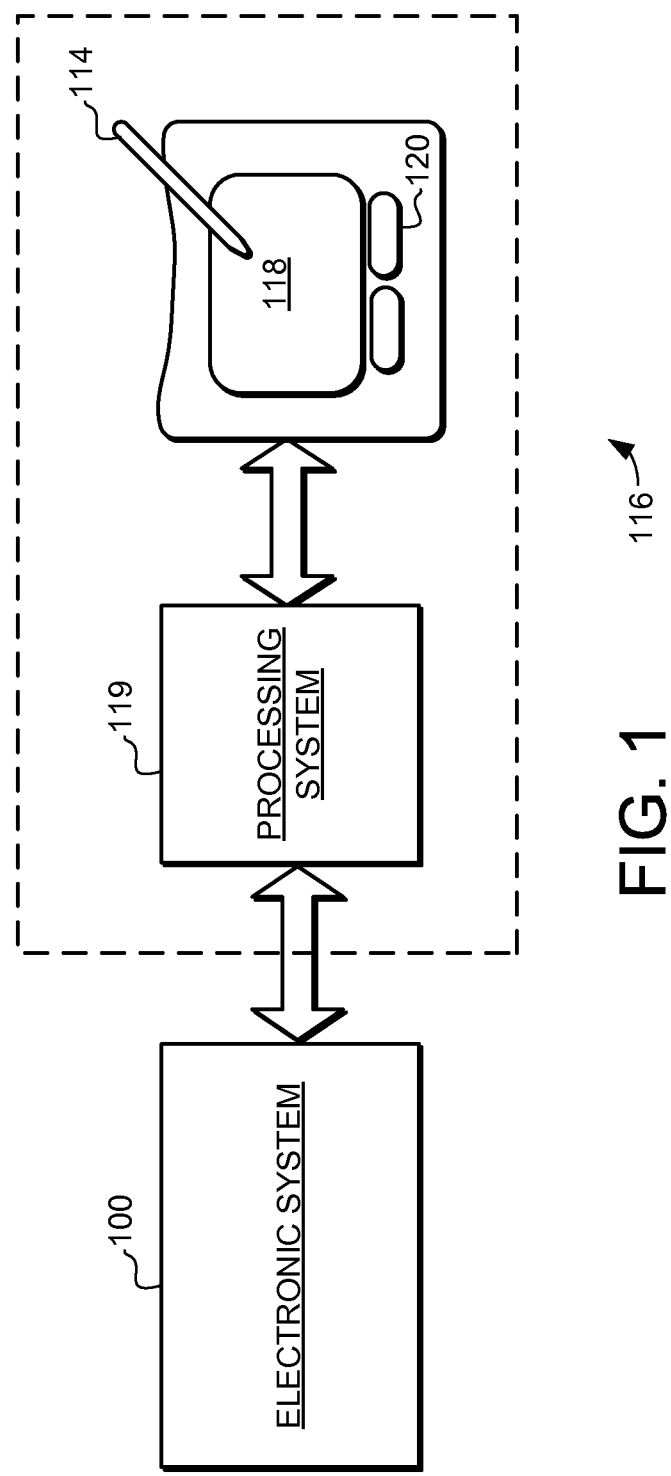
FIG. 1 is a block diagram of an exemplary system including an input device in accordance with an embodiment of the invention.

Turning now to the drawing figures, FIG. 1 is a block diagram of an exemplary electronic system 100 that operates with an input device 116. As will be discussed in greater detail below, the input device 116 can be implemented to function as an interface for the electronic system 100. The input device 116 has a sensing region 118 and is implemented with a processing system 119. Not shown in FIG. 1 is a plurality of sensor electrodes, including at least one transmitter sensor electrode and at least one receiver sensor electrode that are capacitively coupled to form one or more transcapacitances for capacitively sensing objects in the sensing region 118. Also not shown in FIG. 1 is at least one deflectable element, made from a conductive material that is electrically floating (i.e. ohmically insulated from other electrical elements). Such a deflectable conductive element will herein be referred to as a "deflectable electrode". The deflectable electrode is configured to be deflectable toward the sensor electrodes, where deflection of the deflectable electrode toward the sensor electrodes causes a change in the transcapacitance(s) between the transmitter and receiver sensor electrodes. In one embodiment, the deflectable electrode is configured to overlap at least a portion of one or more of the sensor electrodes. In another embodiment, the deflectable electrode is disposed on the surface of a substrate.

The input device 116 is adapted to provide user interface functionality by facilitating data entry responsive to objects in the sensing region, proximate to the input device 116.

Specifically, the processing system 119 is configured to determine a measure of transcapacitance which may be used to determine positional information for input objects in the sensing region 118. This positional information can also be used by the system 100 to provide a wide range of user interface functionality.

Additionally, the processing system 119 can determine a change in transcapacitance due to the deflectable electrode, and can determine information regarding an input object from the determined change in transcapacitance. As one specific example, the processing system 119 may be configured to determine a magnitude of change in a measure of the transcapacitance, and may use the magnitude to determine pressure information for an input object causing deflection of the deflectable electrode. As another example, the processing system 119 may be configured to determine a sign of the change in a measure of transcapacitance, and may use the sign to determine the type of input object, such as to distinguish between conductive and nonconductive input objects. The pressure information and/or type information may then be used by the processing system 119 as part of determining the user input being indicated by the input objects.

The determined pressure information may be used by the system 100 to provide a wide range of user interface functionality, such as indicating when a user has "pressed" to select a particular item with the input device 116. In other embodiments, the positional and pressure information can be used together to provide user interface functionality. For example, the same pressure applied at different locations may result in different system responses.

Likewise, the determined type information may be used by the system 100 to provide interface functionality. For example, by indicating different inputs in response to conductive objects and nonconductive objects.

In many embodiments, at least one deflectable electrode is electrically floating and is configured to be physically deflectable toward the sensor electrodes. In some embodiments, there are multiple such deflectable floating electrodes disposed over the sensing electrodes. By "electrically floating", it is meant that there is no significant ohmic contact between the floating electrode and other circuit elements of the input device, so that no meaningful amount of charge can flow onto or off of the floating electrode under normal circumstances. Of course, any charge present on the conductive floating electrode can still redistribute itself in the presence of an electric field. Thus, the deflectable electrode is capacitively coupled to the sensor electrodes, but it is not ohmically coupled significantly to those or other circuit elements, and it does not require any wiring or other forms of electrical connection to other circuit elements.

Returning to FIG. 1, electronic system 100 is meant to represent any type of stationary or portable computer, including workstations, personal digital assistants (PDAs), video game players, communication devices (e.g., wireless phones and messaging devices), media device recorders and players (e.g., televisions, cable boxes, music players, and video players), digital cameras, video cameras, and other devices capable of accepting input from a user and of processing information. Accordingly, the various embodiments of system 100 may include any type of processing system, memory or display. Additionally, the elements of system 100 may communicate via any combination of protocol and connections, including buses, networks or other wired or wireless interconnections. Non-limiting examples of these include I2C, SPI, PS/2, Universal Serial Bus (USB), Bluetooth, RF, IRDA.

The input device 116 is sensitive to positional input, such as the position or motion of one or more input objects within the sensing region 118. A stylus 114 is shown in FIG. 1 as an exemplary input object, and other examples include a finger (not shown). "Sensing region" 118 as used herein is intended to broadly encompass any space above, around, in and/or near the input device 116 wherein the sensor is able to detect an input object. In a conventional embodiment, sensing region 118 extends from a surface of the input device 116 in one or more directions into space until the noise and decreased signal prevent accurate object detection. This distance may be on the order of less than a millimeter, millimeters, centimeters, or more, and may vary significantly with the type of position sensing technology used and the accuracy desired. Accordingly, the planarity, size, shape and exact locations of the particular sensing regions 118 can vary widely from embodiment to embodiment.

Sensing regions with rectangular projected shape are common, and many other shapes are possible. For example, depending on the design of the sensor pattern and surrounding circuitry, shielding from any input objects, and the like, sensing regions 118 can be made to have two-dimensional projections of other shapes. Similar approaches can be used to define the three-dimensional shape of the sensing region. For example, any combination of sensor design, shielding, signal manipulation, and the like can effectively define a sensing region a distance in the third dimension (into out of the page) in FIG. 1.

In operation, the input device 116 suitably detects positional information of one or more input objects within sensing region 118 using capacitive sensing techniques. In a suitable capacitive implementation of the input device 116, a transcapacitive sensing method based on the capacitive coupling between sensor electrodes may be used. Transcapacitive sensing methods are sometimes also referred to as "mutual capacitance sensing methods." In one embodiment, a transcapacitive sensing method operates by detecting electric field lines coupling one or more transmitting electrodes with one or more receiving electrodes (and thus by detecting the surrounding electric field). Input objects may cause changes in the electric field, and produce changes in the transcapacitive coupling that are detectable by a transcapacitive sensing method. For example, the transcapacitive sensing method may detect changes such as changes in voltage, current, and the like.

In one embodiment with a first set of sensor electrodes and second set of sensor electrodes, the first set of sensor electrodes transmits electrical signals while the second set of sensor electrodes receives electrical signals. In this embodiment, at least one sensor electrode of the first set of sensor electrodes transmits electrically and at least one sensor electrode of the second set of sensor electrodes receives. The sensor electrode(s) of the first set of sensor electrodes that transmit are sometimes referred to as the "transmitting sensor electrode(s)," "driving sensor electrode(s)," "transmitter(s)," or "driver(s)"—at least for the duration when they are transmitting. Other names may also be used, including contractions or combinations of the earlier names (e.g. "driving electrode(s)" or "driver electrode(s)"). The sensor electrode(s) of the second set of sensor electrodes that receive are sometimes referred to as the "receiving sensor electrode(s)," "receiver electrode(s)," or "receiver"—at least for the duration when they are receiving. Similarly, other names may also be used, including contractions or combinations of the earlier names.

It is understood that some transcapacitive sensing systems may not involve pluralities of transmitters and receivers. For example, a transcapacitive sensing system may be implemented with a single transmitter, a single receiver, or both. Further, it is understood that transmitting sensor electrodes may also receive—either simultaneously or in a time multiplexed manner. Similarly, receiving electrodes may also transmit simultaneously or in a time multiplexed manner.

As discussed above, with transcapacitive sensing schemes, the input device 116 determines positional information for input objects in the sensing region 118 by detecting changes in transcapacitive coupling between the sensor electrodes reflective of changes in the electric field due to the presence of an input object. Likewise, the input device 116 may determine pressure information by detecting changes in transcapacitance due to the deflectable electrode being deflected towards the sensor electrodes. Finally, the input device 116 may determine input object type by determining the sign of changes in transcapacitance. Examples of technologies that can be used to implement the various embodiments of the invention can be found at U.S. Pat. Nos. 5,648,642 and 5,841,078 each assigned to Synaptics Inc.

The processing system 119 is coupled to the input device 116 and the electronic system 100. The processing system 119 can perform a variety of processes on the signals received from the sensor to implement the input device 116. For example, the processing system 119 can select or connect individual sensor electrodes, detect presence/proximity, calculate position or motion information, or interpret object motion as gestures.

In some embodiments, the input device 116 uses processing system 119 to provide electronic indicia of positional information to the electronic system 100. The system 100 appropriately processes the indicia to accept inputs from the user, to move a cursor or other object on a display, or for any other purpose. In such embodiments, processing system 119 can report positional information to electronic system 100 constantly, when a threshold is reached, or in response some criterion such as an identified stroke of object motion. In other embodiments, the processing system 119 directly processes the indicia to accept inputs from the user, to move a cursor or other object on a display, or for any other purpose based on any number and variety of criteria.

In this specification, the term "processing system" includes any number of processing elements appropriate to perform the recited operations. Thus, the processing system 119 can comprise any number of discrete components, any number of integrated circuits, firmware code, and/or software code—whatever is needed to perform the recited operations. In some embodiments, all processing elements that comprise the processing system 119 are located together, in or near the input device 116. In other embodiments, these elements would be physically separated, with some elements of the processing system 119 close to the sensor electrodes, and some elsewhere (such as near other circuitry for the electronic system 100). In this latter embodiment, minimal processing could be performed by the elements near the sensor, and the majority of the processing could be performed by the elements elsewhere.

Furthermore, the processing system 119 can communicate with some part of the electronic system 100, and be physically separate from or physically integrated with that part of the electronic system. For example, the processing system 119 can reside at least partially on a microprocessor for performing functions for the electronic system 100 aside from implementing the input device 116.

As used in this application, the terms "electronic system" and "electronic device" broadly refer to any type of device that operates with input device 116. The electronic system 100 could thus comprise any type of device or devices in which an input device 116 can be implemented in or coupled to. The input device 116 thus could be implemented as part of the electronic system 100, or coupled to the electronic system 100 using any suitable technique. As non-limiting examples, the electronic system 100 could thus comprise any type of computing device listed above or another input device (such as a physical keypad or another touch sensor device). In some cases, the electronic system 100 is itself a peripheral to a larger system. For example, the electronic system 100 could be a data input device such as a remote control, or a data output device such as a display system, that communicates with a computing system using a suitable wired or wireless technique. It should also be noted that the various elements (any processors, memory, etc.) of the electronic system 100 could be implemented as part of the input device 116, as part of a larger system, or as a combination thereof. Additionally, the electronic system 100 could be a host or a slave to the input device 116.

In some embodiments the input device 116 is implemented with buttons 120 or other input devices near the sensing region 118. The buttons 120 can be implemented to provide additional input functionality to the input device 116. For example, the buttons can be used to facilitate selection of items using the proximity sensor device. Of course, this is just one example of how additional input functionality can be added to the input device 116, and in other implementations the input device 116 could include alternate or additional input devices, such as physical or virtual switches, or additional proximity sensing regions. Conversely, the input device 116 can be implemented with no additional input devices.

Likewise, the positional information determined the processing system 119 can be any suitable indicia of object presence. For example, the processing system 119 can be implemented to determine "zero-dimensional" 1-bit positional information (e.g. near/far or contact/no contact) or "one-dimensional" positional information as a scalar (e.g. position or motion along a sensing region). Processing system 119 can also be implemented to determine multi-dimensional positional information as a combination of values (e.g. two-dimensional horizontal/vertical axes, three-dimensional horizontal/vertical/depth axes, angular/radial axes, or any other combination of axes that span multiple dimensions), and the like. Processing system 119 can also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. As will be described in greater detail below, the positional information from the processing system 119 facilitates a full range of interface inputs, including use of the proximity sensor device as a pointing device for cursor control, scrolling, and other functions. Likewise, the term "pressure information" as used herein is intended to broadly refer to any measure of the pressure applied.

In some embodiments, the input device 116 is adapted as part of a touch screen interface. Specifically, the proximity sensor device is combined with a display screen that is overlapped by at least a portion of the sensing region 118. Together the input device 116 and the display screen provide a touch screen for interfacing with the electronic system 100. The display screen can be any type of electronic display capable of displaying a visual interface to a user, and can include any type of LED (including organic LED (OLED)), CRT, LCD, plasma, EL or other display technology. When so implemented, the input device 116 can be used to activate functions on the electronic system 100, such as by allowing a user to select a function by placing an input object in the sensing region proximate an icon or other user interface element that is associated with or otherwise identifies the function. The user's placement of the object can thus identify the function to the electronic system 100. Likewise, the input device 116 can be used to facilitate user interface interactions, such as button functions, scrolling, panning, menu navigation, cursor control, and the like. As another example, the proximity sensor device can be used to facilitate value adjustments, such as by enabling changes to a device parameter. Device parameters can include visual parameters such as color, hue, brightness, and contrast, auditory parameters such as volume, pitch, and intensity, operation parameters such as speed and amplification. In these examples, the proximity sensor device is used to both activate the function and then to perform the adjustment, typically through the use of object motion in the sensing region 118.

It should also be understood that the different parts of the overall device can share physical elements extensively. For example, some display and proximity sensing technologies can utilize the same electrical components for displaying and sensing. As another example, an input device can utilize some of the same electrical components to sense multiple different inputs (e.g. different input devices, or inputs in different locations) or multiple aspects of the same input (e.g. pressure and positional information associated with the same user input)

It should also be understood that while the embodiments of the invention are to be described herein in the context of a fully functioning proximity sensor device, elements of the present invention are capable of being distributed as a program product in a variety of forms. For example, elements of the present invention can be implemented and distributed as a proximity sensor program on computer-readable media. Additionally, the embodiments of the present invention apply equally regardless of the particular type of computer-readable medium used to carry out the distribution. Examples of computer-readable media include: memory sticks/cards/modules and disk drives, which may use flash, optical, magnetic, holographic, or any other storage technology.

Embodiments of the input device 116 enable pressure sensing for any type of input device, including fingers and styli. Additionally, in some embodiments, the input device 116 enables input both by objects substantially coupled to ground (e.g. fingers or conductive styli held in a human hand) and by objects not substantially coupled to ground (e.g. non-conductive styli or small conductive objects not coupled to any large ground masses). In these embodiments, input device 116 allows pen-type input with any stylus. In embodiments where fingers and non-conductive styli are both likely to be used, input device 116 also offers the ability to distinguish between conductive fingers and non-conductive styli. Further, some embodiments enable "full image sensing." With "full image sensing," the input device 116 can generate a two-dimensional image of the user input in the sensing region, instead of projections of the user input along particular axes or other alternatives. In one embodiment the two-dimensional image may be referred to as a "transcapacitive image". "Full image sensing" helps facilitate user input with the simultaneous use of multiple input objects, such as any combination of fingers and styli. All of these benefits can be obtained at very little additional cost over conventional touch sensors.

Figure 2B:
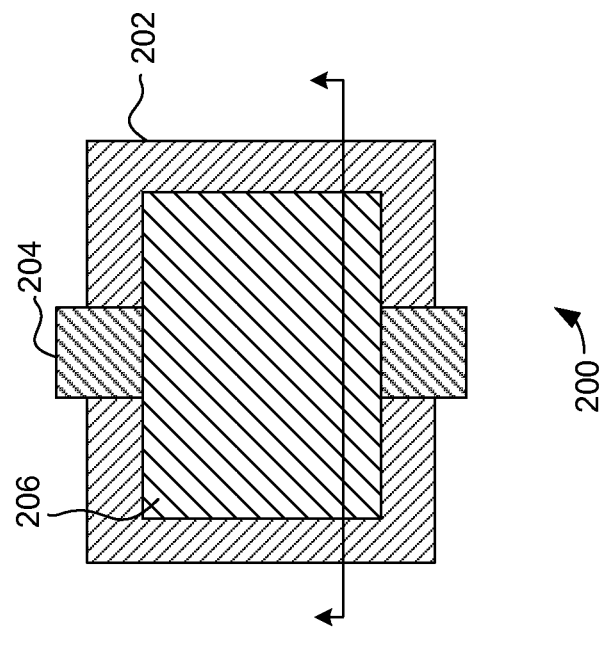
Figure 2A:
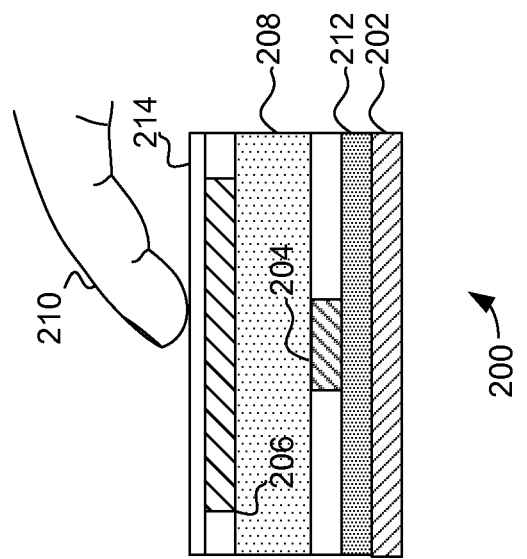

Turning now to FIG. 2, a side view of an exemplary input device 200 is illustrated schematically in FIG. 2a, and a partial top view of device 200 is partially illustrated in FIG. 2b. The input device 200 includes a set of sensor electrodes comprising a transmitter sensor electrode 202 and a receiver sensor electrode 204. The input device also includes a deflectable electrode 206. Between the deflectable electrode 206 and the sensor electrodes 202 and 204 is a deformable layer 208 that facilitates deflection of the deflectable electrode 206 toward the sensor electrodes 202 and 204. Likewise, between transmitter sensor electrode 202 and receiver sensor electrode 204 is an insulating layer 212. The insulating layer 212 ohmically isolates the transmitter sensor electrode 202 from the receiver sensor electrode 204 and in part defines the transcapacitance between those electrodes. Finally, a protective layer 214 covers the deflectable electrode layer. It should be noted that while all these elements are illustrated in FIG. 2a, for clarity FIG. 2b illustrates only the transmitter sensor electrode 202, the receiver sensor electrode 204, and the deflectable electrode 206.

The transmitter sensor electrode 202 and the receiver sensor electrode 204 are capacitively coupled together for sensing inputs objects (e.g., finger 210) in the sensing region. Specifically, the transmitter sensor electrode 202 and the receiver sensor electrode 204 are capacitively coupled through the insulating layer 212 to form a transcapacitance. When input objects such as finger 210 are brought proximate to the input device 200 (i.e., within the sensing region of the input device 200) they cause a change in the measured transcapacitance between the transmitter sensor electrode and the receiver sensor electrode. This change in transcapacitance may be measured and used to detect the presence of the objects causing the change, and determine positional information related to these objects.

Objects such as finger 210 may also be used to apply pressure to the input device 200. Specifically, the finger 210 can press against the protective layer 214 of the input device. The pressing of the finger 210 against the protective layer 214 causes the deformable layer 208 to deform, allowing the deflectable electrode 206 to deflect toward the sensor electrodes 202 and 204. This deflection creates a further change in the transcapacitance between the electrodes. A measure of this further change may be used to determine pressure information for objects applying pressure to the protective layer 214.

In one embodiment, baseline measurements can be used to identify positional and pressure information. In one example, a first measurement of the transcapacitance can be taken when no input objects are within the sensing region and no input objects are applying pressure to the protective layer 214. This transcapacitance can be considered a baseline. Next, a second measurement of transcapacitance is taken. The second measurement can be used to determine if an input object is within the sensing region and/or if an input object is applying pressure to the protective layer by comparing the magnitude of the second measurement to the baseline. If the magnitude of the second measurement is different from the baseline, positional and/or pressure information may be identified.

In further embodiments, to determine pressure information for input objects, threshold levels may be used. Consider a conductive object touching the protective layer; where the conductive object is large enough to completely cover an intersection of a particular transmitter sensor electrode and particular receiver sensor electrode. When such a conductive object is not applying sufficient pressure to deflect the deflectable electrode, it will result in a particular threshold level of decrease in the measured transcapacitance. Any decrease in the measured transcapacitance beyond this threshold level is typically due to the deflection of the deflectable electrode, and is therefore a measure of the pressure applied by the conductive object to the protective layer. Conversely, a nonconductive object such as a stylus, present at the touch surface but not applying significant pressure, will not cause a significant change in the measured transcapacitance and thus will typically not be detectable. However, when the nonconductive object applies pressure at the protective layer and causes deflection of the deflectable electrode, it results in an increase in the measured transcapacitance. The amount of the increase in the measured transcapacitance is a measure of the pressure applied by the nonconductive object to the protective layer. Thus, a determination of the measure of transcapacitance may be used to determine positional information, pressure information, and/or type information for objects in the sensing region and/or applying pressure to the protective layer.

As one example, because a human finger is conductive, it can capacitively couple to the deflectable electrode, and because it is coupled sufficiently to ground (e.g. it is coupled to the human, which has significant ground mass), when the finger approaches and contacts the sensor, it capacitively couples the deflectable electrode to ground. As a result, the deflectable electrode intercepts the electric field between the transmitting and receiving sensor electrodes, thus decreasing the transcapacitance measured between them. Thus, the finger will generally appear as a reduction in transcapacitance, meaning a reduction in capacitive coupling between transmitting and receiving sensor electrodes in the region of the finger. Although a finger is used in this example, other conductive objects with sufficient capacitive coupling to the deflectable electrode may also cause decreases in the measured transcapacitance.

Furthermore, an increase in applied pressure or force deflects the deflectable electrode closer to the transmitting and receiving electrodes, further intercepting the electric field between the transmitting and receiving electrodes, and thus further decreasing the measured transcapacitance. Thus, by examining the decrease in measured transcapacitance between transmitting and receiving electrodes near the estimated center of the finger, the amount of deflection of the deflectable electrode can be estimated, and the applied finger pressure can be determined.

When a non-conductive stylus or other object without substantial coupling to the deflectable electrode or to ground interacts with the input device, the resulting change in transcapacitive coupling differs. The object may lack substantial coupling to the deflectable electrode for many reasons, including because it is only partially conductive or that its area of overlap with the deflectable electrode is relatively small. Alternatively, the object may lack substantial coupling to ground because it is not coupled to a large ground mass or the coupling to the ground mass is weak.

In such cases, as pressure is applied, the deflectable electrode moves closer to the sensor electrodes and increases the capacitive coupling between the transmitting and receiving sensor electrodes. In other words, this pressure/force application has the effect of increasing the measured transcapacitance, since the closer deflectable electrode increases the coupling between the transmitting and receiving electrodes. And again, the magnitude of the change depends at least in large part on the amount of pressure applied.

In one embodiment, the non-conductive object does not capacitively couple to the deflectable electrode and cannot be directly detected by the sensor through sufficiently large changes in capacitive coupling. In other embodiments, where the object is conductive (e.g. a metal coin) but lacks substantial coupling to ground (e.g. the coin is floating electrically and is manipulated with a wooden stick), the object may couple to the deflectable electrode but it will not have a significant grounding effect on the deflectable electrode.

In a further embodiment, a small-tipped conductive stylus with sufficient coupling to ground causes results similar to a non-conductive stylus because the capacitive coupling between the small tip and the deflectable electrode is too small to significantly couple the deflectable electrode to ground.

Because of the way these different objects change the transcapacitance, the input device may be configured to distinguish between conductive objects and nonconductive objects. In one embodiment, a conductive object has a relatively high ground mass and a nonconductive object has a relatively low effective ground mass. In further embodiments, the sign (increase or decrease) of the change in transcapacitance may be used to determine if the object causing deflection of the deflectable electrode is a non-conductive object or a conductive object. Specifically, the input device can be configured such that an increase in transcapacitive coupling indicates the presence of a conductive object substantially coupled to ground and a decrease in transcapacitive coupling indicates pressure applied by a nonconductive object.

A variety of different materials and techniques can be used to form the transmitter sensor electrode 202, the receiver sensor electrode 204, and the deflectable electrode 206. For example, the transmitter sensor electrode 202 and the receiver sensor electrode 204 can be patterned using a conductive material, such as ITO (indium tin oxide), silver or carbon conductive ink, and copper. Further, any appropriate patterning process may be used, including sputter deposition, printing, and etching. Such materials may also be used to form the deflectable electrode 206. However, in some embodiments it may be desirable to form the deflectable electrode 206 from a resistive material having a significant resistivity. Examples of such an embodiment will be discussed in greater detail below.

It should be noted that in input device 200, the deflectable electrode 206 overlaps at least a portion of the transmitter sensor electrode 202 and the receiver sensor electrode 204. Such overlapping can provide significant advantages in some embodiments. For example, it increases the capacitive coupling between the deflectable electrode 206 and the sensor electrodes 202 and 204, thus making is easier to detect changes in transcapacitance due to movement of the deflectable electrode.

In some embodiments, the deflectable electrode 206 can be disposed upon the surface of a substrate. In these embodiments the deflectable electrode 206 can be formed with a variety of techniques. For example, the deflectable electrode 206 can be formed using printing techniques that utilize conductive ink. In other examples, the deflectable electrode 206 can be formed by patterning a conductive material. In these techniques, the conductive material may be deposited on the substrate, and a portion of the material is etched away to leave behind the deflectable electrode 206 structure. In each of these examples the resulting deflectable electrode 206 is disposed upon the surface of the substrate.

As described above, the deformable layer 208 facilitates deflection of the deflectable electrode 206 toward the sensor electrodes 202 and 204. A variety of different materials and structures can be used to form the deformable layer 208. In one embodiment, the deformable layer 208 may include a material that compresses under pressure and returns to its original shape when released. Examples of such materials include various compliant foams, rubbers, elastomers, and silicone gels. Materials usable in embodiments of the invention include, but are not limited to, SYLGARD silicone dielectric gel available from Dow Corning of Midland, Mich., or PORON cellular urethane sheet available from Rogers Corporation of Rogers, Conn. Deformable materials can be manufactured over a wide range of stiffness, commonly quantified by a measure called durometer hardness. In some embodiments, materials with durometer hardness measurements in a range of from about 0.1 to about 10 may be suitable.

In some embodiments the deformable layer 208 will be arranged with other structures designed to facilitate deflection of the deflectable electrode 206. For example, in some embodiments a variety of spacers and openings can be arranged to allow the deflectable electrode 206 to move further in response to force or pressure applied by the user. Examples of such embodiments will be described in greater detail below.

The protective layer 214 is disposed on the deflectable electrode 206. Typically, the protective layer 214 comprises a flexible material that allows force or pressure to be transmitted to the deformable layer 208. In one embodiment, an appliqué is employed as the protective layer 214. In one embodiment, the protective layer 214 comprises a touch surface and forms a part of the capacitive touch sensor that is designed to be touched by users. When used as such a touch surface, the protective layer 214 preferably has a pleasing tactile feel or texture. Since such a touch surface is viewable to the users, it also preferably has a pleasing visual texture. The protective layer 214 can be formed from any appropriate material. For example, the protective layer 214 can be implemented using a sheet of textured polyester material, such as that sold under the trade name MYLAR. Where polyester is used, the protective layer 214 can be of any appropriate thickness, including from about 0.1 mm to about 0.6 mm thick. In many embodiments, the protective layer includes an adhesive on its underside for affixing it to the top of the deflectable electrode 206 or a substrate holding the deflectable electrode 206. In some embodiments, the substrate holding the deflectable electrode is a deformable layer. In yet other embodiments, the protective layer 214 is the substrate holding the deflectable electrode.

The material used to form the protective layer 214 can range from completely opaque to completely transparent. A surface of the protective layer 214 may be painted or otherwise colored to give a uniform appearance. Alternatively or in addition, logos, lettering, graphics, combinations thereof, or other patterns can be applied to protective layer 214. Often, such decorations are embedded or applied on a back side of the protective layer such that they are protected from wear during use. Other materials suitable for the protective layer 214 include all manners of plastics, including polyethylene terephthalate (PET), polyimide, and polycarbonate (sometimes sold under the trade name LEXAN), combinations thereof, and the like. In an embodiment employing polycarbonate, the sheet thickness of the protective layer is often in a range of about 0.1 mm to about 0.6 mm.

In some embodiments, it may be desirable to limit the deflection of the deflectable electrode so that it does not come too close to the sensor electrodes when it is deflected. This may be achieved by using a deformable material of appropriate thickness or spacer systems that ensure a minimum separation distance. Alternatively or in addition, an insulating layer may be disposed between the deflectable electrode and the sensor electrodes. For some transparent embodiments that will be described in greater detail below, the sensor electrodes 202 and/or 204 can be patterned on the underside of a bottom substrate (farther away from the deflectable electrode(s)) or a thin insulating material such as a PET sheet can be placed above the sensor electrodes (i.e., between the sensor electrodes and the deflectable electrode 206).

The embodiment illustrated in FIG. 2 is an input device 200 that includes only one transmitter sensor electrode 202, one receiver sensor electrode 204, and one deflectable electrode 206. Implemented by itself, such a device can be used to determine zero-dimensional positional information and force/pressure and type information for one object at a time. Other implementations may include multiple such electrodes arranged together and having the ability to determine such information for multiple input objects simultaneously. Additionally, such devices can typically determine a wider range of positional information, such as the one and two dimensional position information described above. A variety of these different embodiments will be described below. It should be noted that in many of these embodiments the deflectable electrode could be implemented as a single electrode that overlaps multiple transmitter and receiver sensor electrodes. Conversely, such devices can be implemented with multiple deflectable electrodes. In one specific embodiment, a deflectable electrode is formed over each meeting region (e.g., crossing location) between a transmitter sensor electrode and a receiver sensor electrode.

Figure 3:
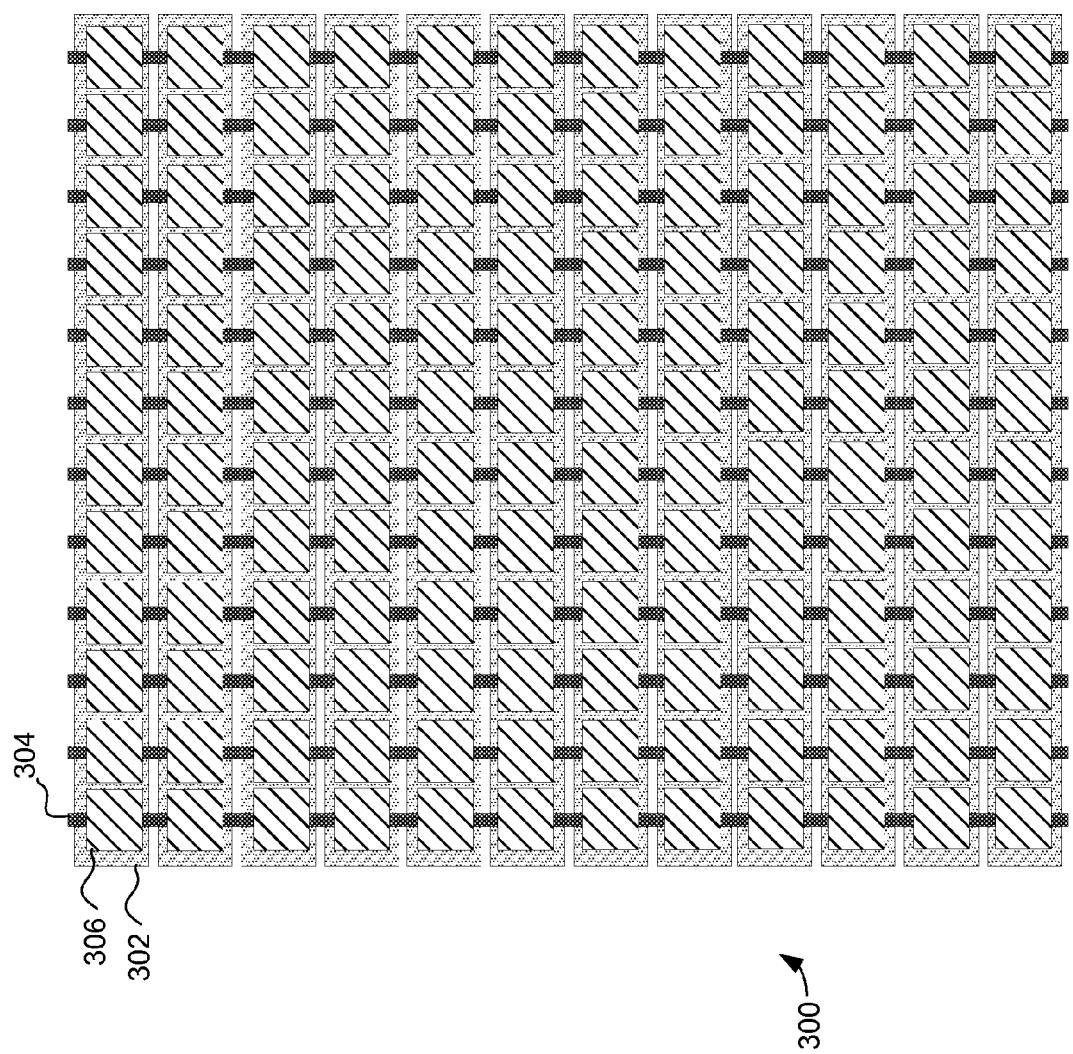

Turning now to FIG. 3, a top view of an exemplary input device 300 is illustrated. In this embodiment, the input device 300 includes a set of transmitter sensor electrodes 302, a set of receiver sensor electrodes 304, and a plurality of deflectable electrodes 306. The input device 300 can be considered to be an extension of the input device 200 illustrated in FIG. 2, using multiple transmitter sensor electrodes and/or multiple receiver sensor electrodes to form multiple meeting regions. As such, the input device 300 may be configured to determine positional and pressure information for multiple objects applying force or pressure in the sensing region, or for multiple parts of a larger object, such as multiple points of contact on the palm of a hand being applied to the surface. It should also be noted that in this embodiment each of the deflectable electrodes may overlap at least a portion of one of the transmitter sensor electrodes 302 and/or one of the receiver sensor electrodes 304.

In this illustrated embodiment, the set of transmitter sensor electrodes 302 is aligned in a first direction, and the set of receiver sensor electrodes 304 is aligned in a second direction, with the transmitter sensor electrodes 302 electrically insulated from the receiver sensor electrodes 304. Specifically, the relatively wide, horizontal bars represent the transmitter sensor electrodes 302. Meanwhile, the narrow, vertical bars (that are partially obscured by the deflectable electrodes 306) represent the receiver sensor electrodes 304. Both the transmitting and receiving electrodes can be fabricated as part of a printed circuit, including flexible or rigid touch sensor circuit boards. As such, the transmitting and receiving electrodes can be disposed on a substrate assembly that includes one or more substrates, and that forms part or all of an entire circuit assembly. Where the transmitting and receiving sensor electrodes are disposed on a same substrate, they can be disposed on the same side of the substrate, on opposite sides of the substrate, or both (e.g. where parts of the sensor electrodes are placed on both sides of the substrate). It is understood that many different variations of the embodiment shown in FIG. 3 are viable. For example, the deflectable electrodes 306 are shown as rectangles, but they could be of any other shape appropriate for causing changes in capacitive coupling between the transmitting and receiving sensor electrodes when deflected.

Figure 4:
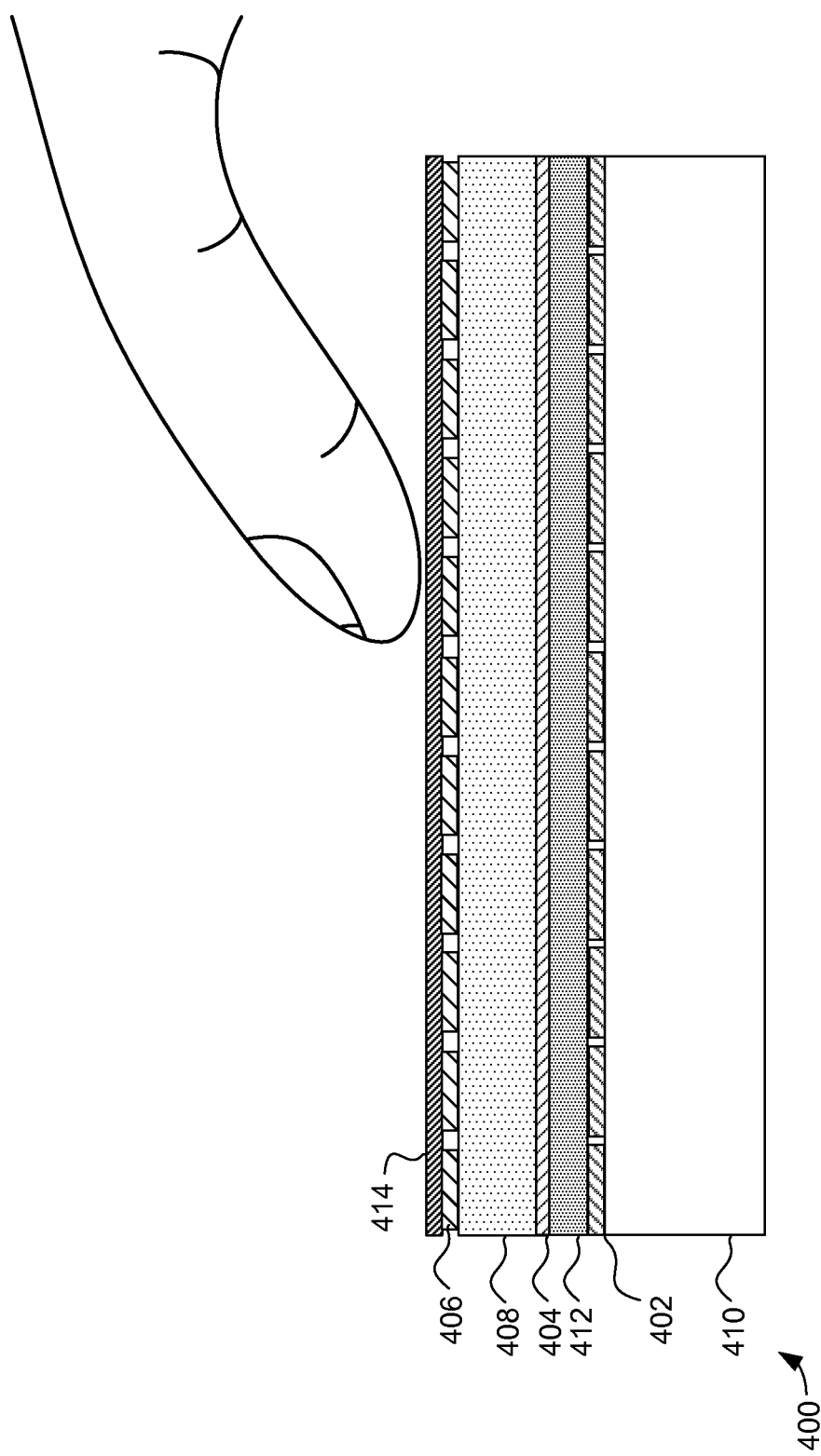

Turning now to FIG. 4, FIG. 4 illustrates a cross-sectional side view of an input device 400 in accordance with a similar embodiment. The input device 400 includes a set of transmitter sensor electrodes 402, a set of receiver sensor electrodes 404, and a layer of one or more deflectable electrodes 406, all above a substrate 410. Together, the transmitter sensor electrodes 402 and the receiver sensor electrodes 404 may be referred to as the sensor electrodes. An insulating layer 412 is located between the set of transmitter sensor electrodes 402 and the set of receiver sensor electrodes 404. A deformable layer 408 is located between the deflectable electrodes 406 and the sensor electrodes. In this orientation, the deflectable electrodes are located "above" the sensor electrodes. "Above" is used as an orientation, in this case, to denote "closer to the touch surface where input objects are expected to make contact." Each of the deflectable electrodes 406 may be configured to overlap at least a portion of one of the sensor electrodes, and is further configured to be deflectable toward those electrodes.

The embodiments shown in FIGS. 3 and 4 each include a deflectable electrode layer comprising a plurality of deflectable electrodes laid out in a rectilinear array, with a deflectable electrode over each intersection of a transmitting and a receiving sensor electrode. However, it should be noted that this is just one possible arrangement, and that other layouts are possible. Furthermore, while the layer of deflectable electrodes 406 is illustrated with all the electrodes being coplanar, this is also just one possible arrangement. Specifically, in other arrangements the layer of deflectable electrodes 406 may include one or more non-coplanar electrodes.

As shown in FIG. 4, the transmitting and receiving sensor electrodes are disposed on substrate 410. The substrate 410 can comprise a variety of different arrangements and materials, such as glass or plastic (one common plastic substrate is polyethylene terephthalate, PET). Substrates of other types of materials are also possible. In addition to these types of materials, the substrate 410 may also include multiple layers, including layers of conductive material or non-conductive material. These other layers may provide electrical shielding, physical protection, fastening ability, and the like. It should also be noted that the substrate 410 may be part of a larger substrate assembly. Also illustrated in this embodiment is a top protective layer 414 located above the deflectable electrodes 406.

The deformable layer 408 serves to facilitate deflection of the deflectable electrodes 406 toward the sensor electrodes 402 and 404, thus facilitating the functionality described with reference to FIG. 2. Specifically, the deflectable electrodes 406 can be deflected toward the sensing electrodes by the application of pressure to the protective layer 414 or to another component that transmits the pressure in such a way that it moves the deflectable electrodes. Thus, a user can press on the protective layer and deflect one or more deflectable electrodes 406 toward the sensing electrodes. As was described above, movement of the deflectable electrodes 406 toward the sensing electrodes changes a measure of the transcapacitance, which can be used to provide a measure of the pressure applied to the protective layer of the input device and/or determine the type of object applying the pressure.

Furthermore, because a measure of a transcapacitance can be determined for each intersection of the transmitter sensor electrodes 402 and the receiver sensor electrodes 404, the device 400 facilitates the determination of an array of positional and pressure information. Thus, the device 400 can be used to determine a multi-dimensional "transcapacitance image" of objects applying pressure to the surface of the device. By examining the multi-dimensional transcapacitance image, "peaks" and "depressions" can be located and interpreted as corresponding to the locations of fingers or other objects. The heights of these peaks and the depths of these depressions can provide independent measures of pressure or force for each of the input objects, and their lateral extents can help indicate the sizes or shapes of the input objects.

Moreover, it is possible to determine the type of input object by examining the two-dimensional transcapacitance image. In one embodiment, "peaks" can be seen corresponding to the locations of input objects without sufficient coupling to the deflectable electrode or to ground, and "depressions" can be seen corresponding to the locations of conductive fingers or other objects capable of sufficiently coupling the deflectable electrodes to ground.

In the embodiment illustrated in FIGS. 3 and 4, the transmitting and receiving electrodes are arranged in rows and columns, respectively. Further, each transmitting electrode is aligned parallel to all other transmitting electrodes in the set of transmitting electrodes, and each receiving electrode is aligned parallel to all other receiving electrodes in the set of receiving electrodes. As can be seen in FIG. 3, the transmitter sensor electrodes 302 and receiver sensor electrodes 304 are arranged as rectangular bars orthogonal to each other; however, it is possible for them to be arranged using other relationships. For example, in other embodiments, the transmitting and receiving electrodes may be arranged so that at least one transmitting electrode is intertwined with at least one receiving electrode, or so that at least one transmitting electrode is interweaved with at least one receiving electrode. More detailed examples of these embodiments will be illustrated and discussed below. As a further example, the alignments of the transmitting and receiving electrodes need not be 90 degrees, and can be at any other angle such as 45 degrees, 60 degrees, etc.

In the illustrated embodiment, the insulating layer 412 is disposed between the transmitting electrodes 402 and the receiving electrodes 404, each representing separate layers. In this embodiment, transmitting electrodes 402 are disposed below receiving electrodes 404. In another embodiment, transmitting electrodes 402 can be disposed above receiving electrodes 404. In yet another embodiment, at least part of the transmitting electrodes can be patterned on the same layer as at least part of the receiving electrodes. In such an embodiment, if the transmitting electrodes and the receiving electrodes need to cross over each other, jumpers can be used at the intersections between the transmitting and receiving electrodes as appropriate, to prevent the transmitting and receiving electrodes from ohmically contacting each other. Examples of electrode structures where both transmitting and receiving electrodes are formed on the same layer will be described in greater detail below.

In input device 400, there are locations where the transmitting and receiving electrodes are in sufficient physical proximity as to experience substantial capacitive coupling. These locations are herein referred to as meeting regions. In this embodiment, the meeting regions are located at each crossing of a transmitting and a receiving electrode. Each such crossing location can be considered a detection node of the input device 400. In other embodiments, a meeting region is located where a transmitting electrode and a receiving electrode are physically adjacent to one another. Thus, meeting regions and corresponding detection nodes can be formed in many ways in various embodiments, including interweaving, interdigitating, crossing over, and intertwining at least one transmitting and at least one receiving electrode.

As compared to a transcapacitive sensor without deflectable electrodes, the addition of deflectable electrode(s) as illustrated in FIGS. 2-4 increases the capacitive coupling between transmitting and receiving electrode at the meeting regions. Furthermore, the addition of the deflectable electrode(s) allows the input device to measure the applied pressure/force of an input object. Moreover, the addition of the deflectable electrode(s) allows the input device to distinguish between some conductive objects and non-conductive objects.

The ability to measure input object pressure/force can help significantly with rejecting unintentional input, as might occur if the input object or finger accidentally brushes lightly across the surface of the input device.

The ability to distinguish between conductive objects with sufficient capacitive coupling to the deflectable electrode layer (e.g. fingers) and objects without sufficient capacitive coupling to the deflectable electrode layer (e.g. non-conductive styli or styli with small tips) offers many advantages. For example, it can be used to address situations such as where a hand rests in the sensing region while a stylus (not substantially coupled to the deflectable electrode layer or to ground, or both) interacts with the input device. With many current input devices, the hand may dominate the stylus, or the stylus may not be detected. With embodiments of the present invention, the hand shows up as a large "depression" in the transcapacitance image, while the stylus shows up as a readily distinguishable sharp peak.

Since the deflectable electrode layer is designed to be electrically floating, electrical connections to the deflectable electrode layer are not needed. This can greatly simplify design and manufacture, improve reliability, and significantly reduce the costs as compared with other designs.

As was described with reference to FIG. 2, a variety of different structures, materials, and arrangements can be used to facilitate the movement of the deflectable electrode. For example, a deflectable electrode can be disposed on a variety of deflectable substrates that provide support but also flex or otherwise move to allow the deflectable electrode to move. Also, the deflectable electrode can be separated from the transmitting and receiving electrodes by a spacer system, air gaps, other structures, or combinations thereof that facilitate or regulate deflection.

Figure 5:
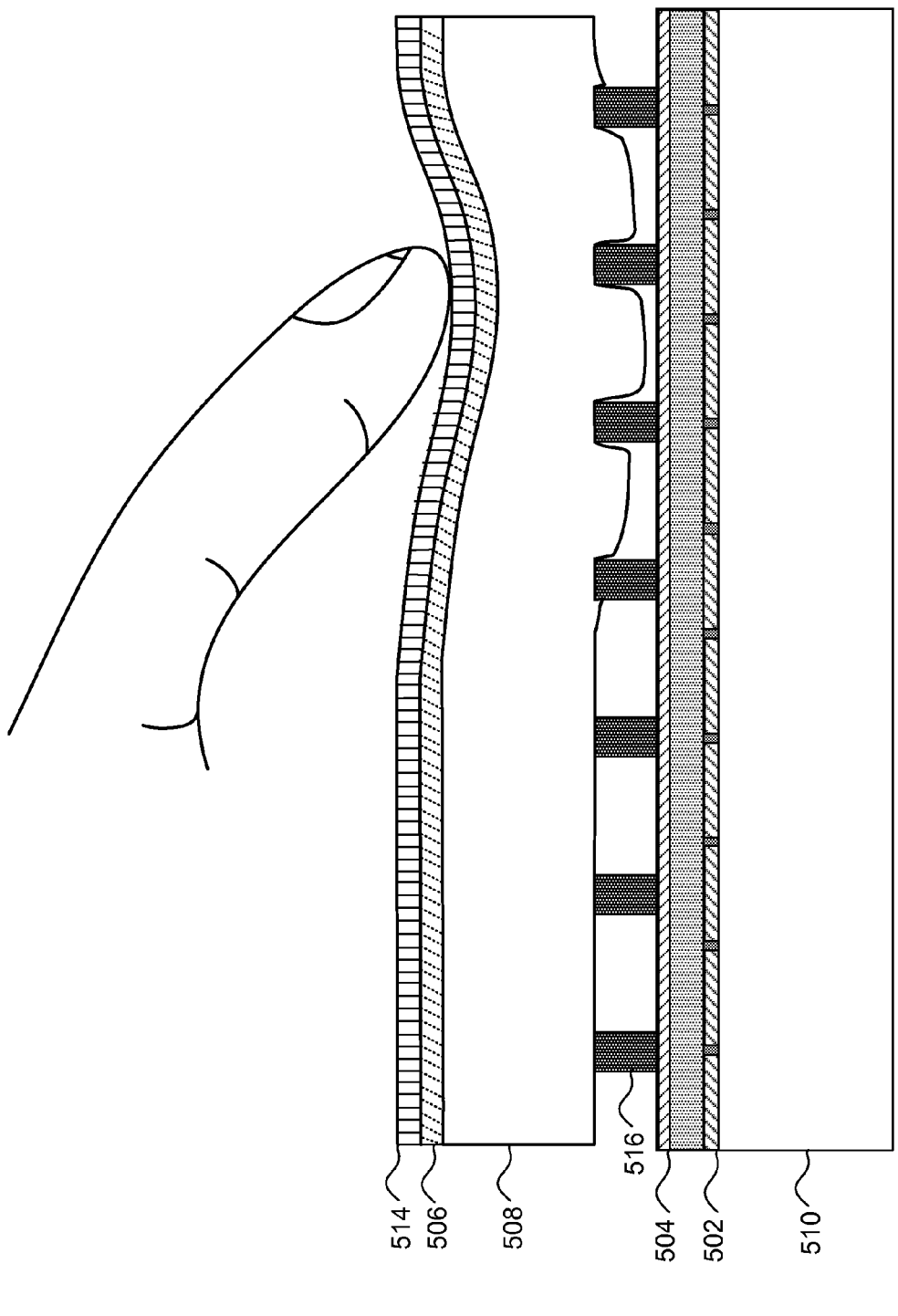

Turning now to FIG. 5, a cross-sectional view of input device 500 in accordance with another embodiment is illustrated. The input device 500 includes a set of transmitter sensor electrodes 502 and a set of receiver sensor electrodes 504 disposed on a substrate 510, and a deflectable electrode layer 506 that comprises one or more deflectable electrodes. A deformable layer 508 is located between the deflectable electrode layer 506 and the sensor electrodes. A set of spacer elements 516 is formed between the deformable layer 508 and the sensor electrodes. Finally, a protective layer 514 is located over the deflectable electrode layer 506.

This construction may involve forming the deflectable electrode layer 506 directly on the deformable layer 508, directly on the protective layer 514, or on a separate substrate located between deformable layer 508 and protective layer 514.

Unlike the previous embodiments, a set of spacer elements 516 is disposed beneath the deformable layer 508. In this embodiment, the set of spacer elements 516 forms a gap that the deformable layer 508 may displace in response to pressure applied to the protective layer 514. Specifically, the deformable layer 508 conforms into the space between the spacer elements when sufficient force or pressure is applied to the protective layer 514, thus allowing a portion of the deflectable electrode layer 506 to deflect toward the sensor electrodes 502 and 504.

The set of spacer elements 516 can be formed from a variety of different materials and arranged in a variety of arrangements. In the embodiment illustrated in FIG. 5, the spacer elements 516 comprise relatively rigid structures laid out in a regular pattern. However, other shapes, rigidities, designs, and layouts can be used for the spacer elements 516. For example, the spacer elements 516 may be replaced or enhanced by a single spacer component arranged around a perimeter of the deformable layer. Alternatively, the spacer elements 516 may be fabricated as protrusions of the deformable layer 508 itself, such that the deformable layer 508 and the spacer elements 516 are constructed from the same material as a single contiguous unit. Furthermore, the spacer elements 516 can be formed from different materials, including incompressible materials and compressible materials, where the compressible materials may be used to further facilitate deflection of the deflectable electrode layer 506.

Figure 6:
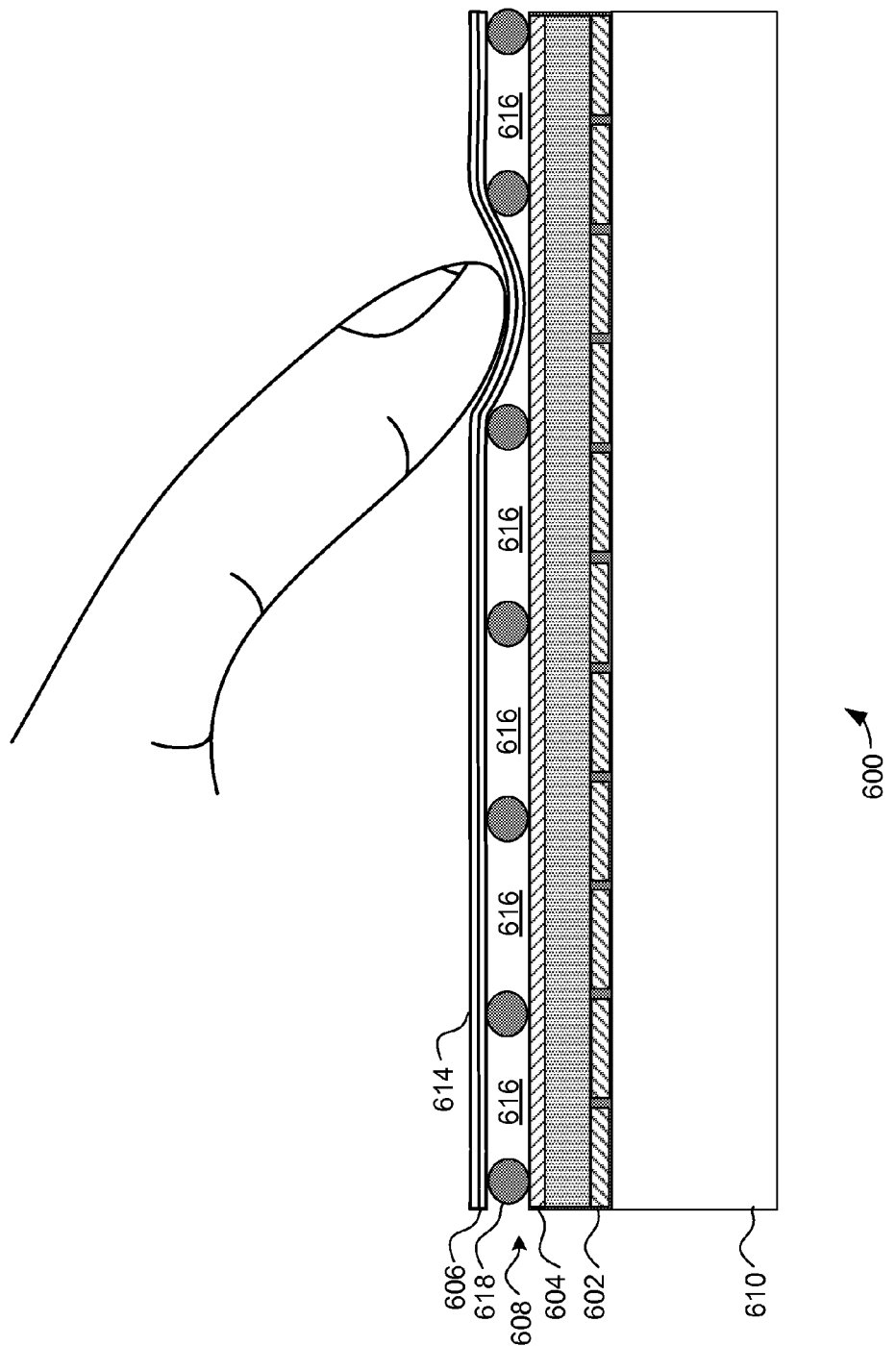

Turning to FIG. 6, another embodiment of an input device 600 is shown. This embodiment, like that illustrated in FIG. 5, includes spacer elements 618 disposed between the deflectable electrode layer 606 and the sensor electrodes 602 and 604. However, this embodiment does not use a separate deformable layer.

Specifically, the input device 600 includes a set of transmitter sensor electrodes 602 and receiver sensor electrodes 604 disposed on a substrate 610, and a deflectable electrode layer 606. A spacer system 608 is disposed between the deflectable electrode layer 606 and sensor electrodes 602 and 604. This spacer system includes a set of spacer elements 618 separated by gaps 616. Finally, a deflectable protective layer 614 is formed over the deflectable electrode layer 606. In one embodiment, an insulating layer may be added between the deflectable electrode layer 606 and the sensor electrodes. This insulating layer may be located above the spacer elements 618, or below them.

As noted above, this embodiment uses spacer elements 618 and air gaps 616 to facilitate deflection of the deflectable electrode layer 606, but does not utilize an additional deformable layer. This embodiment may be advantageous in implementations where the input device is made partially or entirely transparent for such applications as placement over a display to form a touch screen. In such implementations the optical properties of a deformable layer are often not ideal, as deformations in the deformable layer may alter the path of light rays travelling through the material. Furthermore, if the deformable layer does not fully return to its non-deformed state due to non-ideal material properties, it likely imparts a persistent optical degradation onto the touch screen. By eliminating the deformable layer altogether, the embodiment of FIG. 6 provides enhanced optical clarity for touch screen applications. In these embodiments the gaps 616 may be filled with air or any other suitable gas or fluid. Other embodiments that can be implemented as part of a touch screen will be described in greater detail below.

It should be noted that any suitable shape, structure, and layouts can be used to implement the spacer system 608. The number and spacing of the spacer elements may be different from that shown in FIG. 6. Likewise, as noted above, any suitable material can be used to form the deflectable layers.

Figure 7:
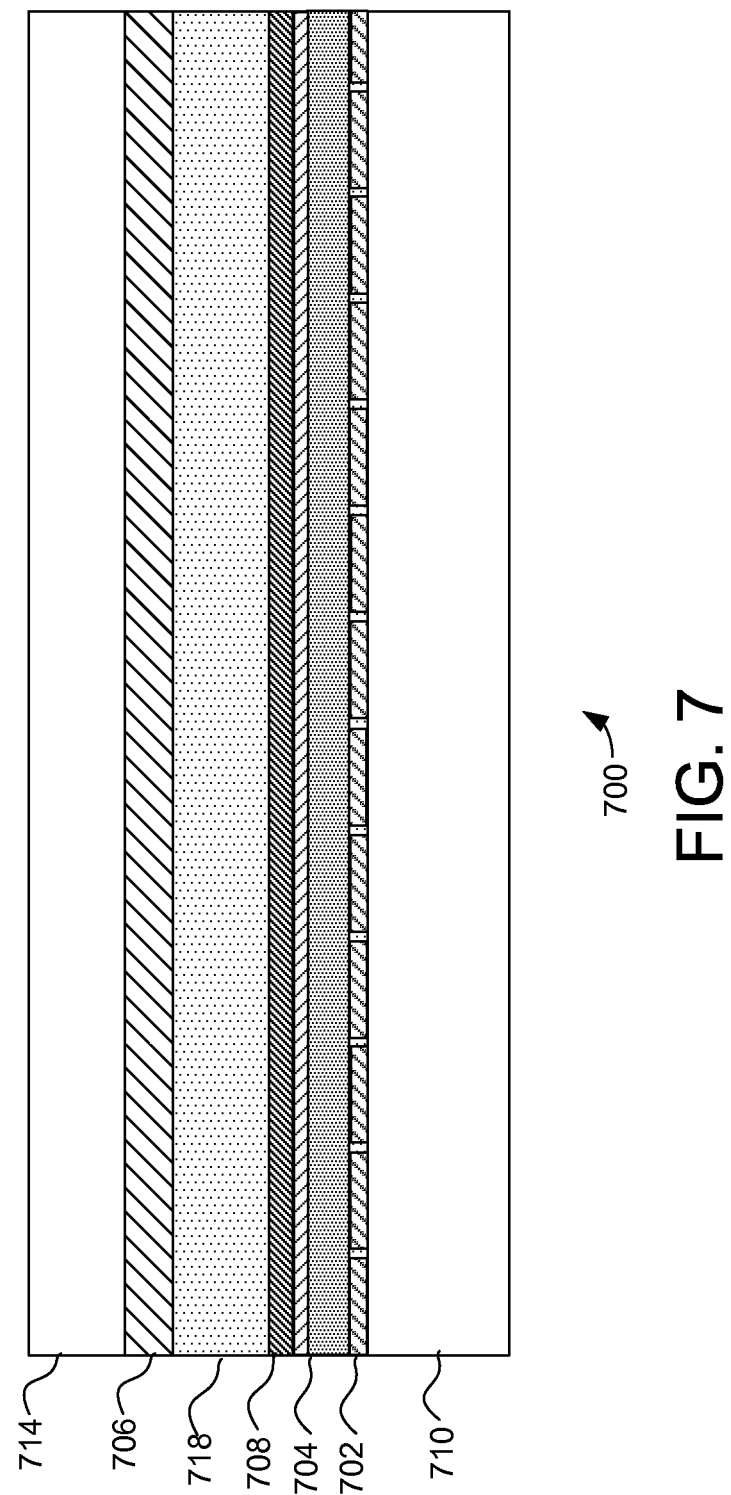

Turning now to FIG. 7, another embodiment of an input device 700 is illustrated that also has improved optical properties, similar to the embodiment of FIG. 6. The input device 700 includes a set of transmitter sensor electrodes 702 and receiver sensor electrodes 704 disposed on a substrate 710 and a deflectable electrode layer 706. In this embodiment, an air gap 718 and insulating layer 708 are disposed between the deflectable electrode layer 706 and sensor electrodes 702 and 704. FIG. 7 shows the insulating layer located below the air gap, but it may instead be located above the air gap. Finally, a protective layer 714 is again formed over the deflectable electrode layer 706.

Compared to the embodiment of FIG. 6, this embodiment does not use an array of spacer elements and the insulating layer 708 is added between the deflectable electrode layer 706 and the transmitting/receiving electrodes. This insulating layer is configured to prevent the deflectable electrode layer from inadvertently forming an ohmic contact with the sensor electrodes when deflected, or from capacitively coupling too strongly with the sensor electrodes.

As was discussed above, transparent embodiments of the input device may be placed over display screens, and allow the viewing of displays through the sensor. Transparent embodiments of the various input devices described above can be made by using ITO or some other transparent conductor for the electrodes, and patterning them on a suitable transparent substrate. For example, transmitter and receiver sensor electrodes can be patterned (such as with sputtering and etching) using ITO on glass. As another example, some or all of the sensor electrodes can be made with dimensions sufficiently small as to be difficult to see, or even invisible. Dimensions that are hard to see by the unaided human eye typically include opaque lines 50 microns in width or smaller. Dimensions that are effectively invisible to users typically include opaque lines less than 12 microns in width.

In these transparent embodiments, the deflectable electrode layer can be patterned on a flexible PET substrate that is mounted above the lower substrate. The mounting can be done in such a way that the deflectable electrode layer is on the underside of the PET substrate. The deflectable electrode layer can be separated from the sensor electrodes with one or more air gaps, spacer elements, and the like.

As was described above, in some embodiments it is desirable to provide additional features to prevent ohmic contact or excessive capacitive coupling between the deflectable electrode layer and the sensor electrodes. In this case, insulating material (e.g. an insulating layer) may be located between the deflectable electrode layer and the sensor electrodes. This may be helpful in touch screens where structures such as spacers may not be desirable for optical reasons. In one embodiment, the insulating material comprises another substrate, such as a PET substrate. In another embodiment, the deflectable electrode layer is disposed on an insulative substrate that is mounted such that the deflectable electrode layer is separated from the sensor electrodes by the substrate. With such an embodiment, a protective layer may be applied to protect the deflectable electrode layer. Where the input device is made transparent, the insulative substrate can be made of transparent material.

A variety of different structures can be used to implement the deflectable electrode layer. As was noted above, the deflectable electrode layer can comprise one electrode spanning over all or part of multiple transmitter and receiver sensor electrodes. Alternatively, a plurality of deflectable electrodes can be used. In the embodiment illustrated in FIGS. 3 and 4, a plurality of separate deflectable electrodes was implemented, with each of the deflectable electrodes arranged to overlap a corresponding meeting region of a transmitter and receiver electrode. In that example, the deflectable electrodes are laid out in a rectilinear array, with the arrangement of the array corresponding to the underlying sensor electrodes such that each of the individual deflectable electrodes overlaps a meeting region of a transmitter and a receiver electrode. Of course, this is just one example, in other embodiments the deflectable electrodes are disposed in other areas proximate the transmitting and receiving electrodes.

Figure 8:
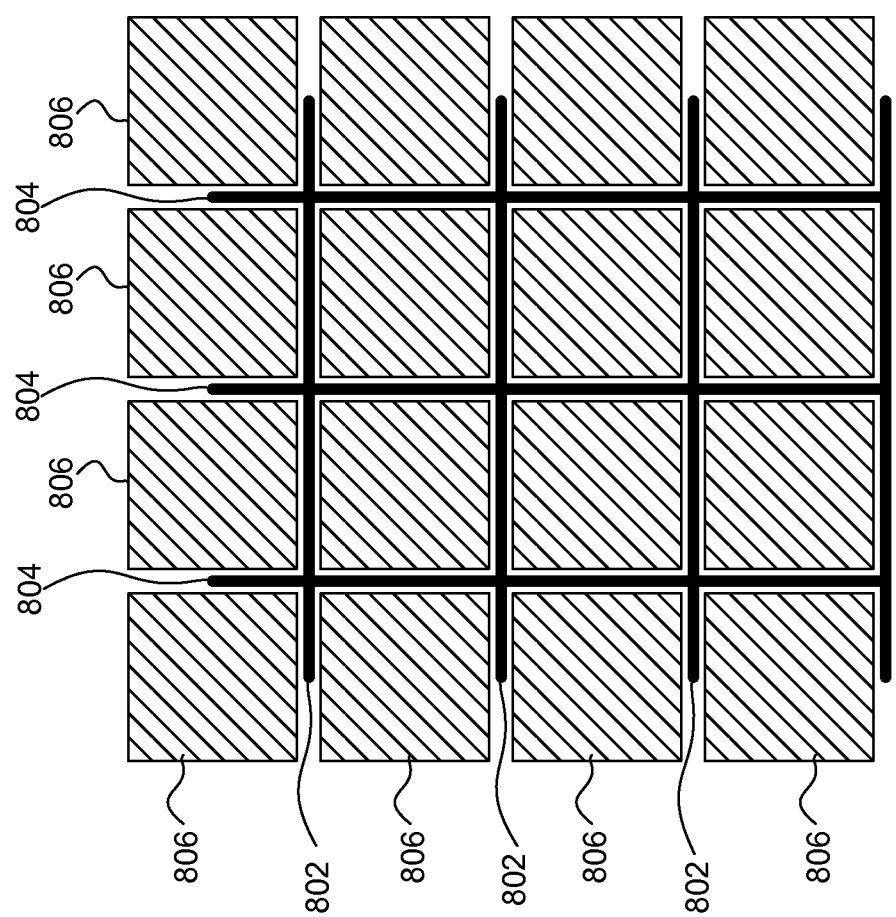

As one specific example, the deflectable electrodes can be disposed in regions between the sensor electrodes. Turning now to FIG. 8, another embodiment of an input device 800 is illustrated. The input device 800 includes an array of deflectable electrodes 806, a plurality of transmitter sensor electrodes 802 extending horizontally, and a plurality of receiver sensor electrodes 804 extending vertically. In this embodiment, the deflectable electrodes 806 are disposed to be in the regions between the receiving and transmitting electrodes 804 and 802.

As was noted above, in other embodiments the deflectable electrode can be provided by a single electrode (or alternatively, a smaller subset of deflectable electrodes) that overlaps all (or part of) the transmitting and receiving electrodes.

For example, a sheet of resistive material can be used to form a deflectable electrode layer that is disposed over a plurality of meeting regions. In one embodiment the sheet of resistive material has a uniform resistance. The resistance of the electrode is sufficient to limit the area where an input object changes the transcapacitive coupling and also sufficient to prevent the grounding effect of a proximate conductive object from spreading out over the entire sensor. Such an input device can be further implemented wherein the deflectable electrode layer comprises one or more sheets having substantially uniform resistance. In this embodiment, each sheet could be formed with a resistive material.

Figure 9:
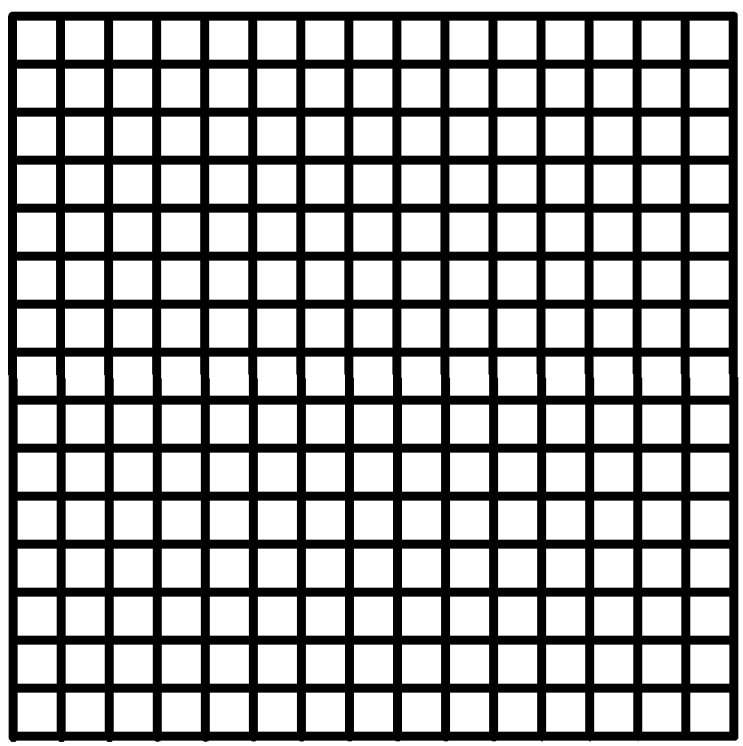

In another such embodiment, the deflectable electrode layer can be implemented with a patterned structure. For example, the deflectable electrode layer can be implemented using a resistive mesh. The mesh may be in a grid pattern or some other pattern. Turning to FIG. 9 an example embodiment of a deflectable electrode layer 906 with a regular grid-type mesh structure is illustrated. Like using a sheet of resistive material, the resistive mesh structure limits the area where the user input changes the transcapacitive coupling.

It should be noted that resistive materials, materials of uniform resistance and mesh structures can be implemented in devices that include a plurality of deflectable electrodes. For example, multiple resistive sheets, multiple sheets of uniform resistance, or multiple meshes, can be used. Each deflectable electrode can be implemented to cover one, some, a significant portion of, or all of the meeting regions.

The embodiments of the invention can be implemented with a variety of sensing electrode structures. As noted above, FIGS. 2-4 illustrate embodiments where the transmitting and receiving electrodes are predominately straight, and configured to be aligned in substantially orthogonal directions along their entire length. However, the embodiments can also be applied to other electrode patterns and structures, including those with intertwined electrode patterns that are configured to be substantially orthogonal to each other or placed at other angles with respect to each other.

Turning to FIG. 10, an example of such an intertwined electrode pattern is illustrated. In FIG. 10, the receiving electrodes 1004 are shown with dotted lines, and the transmitting electrodes 1002 are shown with solid lines. The transmitting electrodes 1002 and the receiving electrodes 1004 are locally aligned in different directions at different areas in the pattern, but are generally aligned orthogonally to each other. In this embodiment, the transmitting and receiving electrodes are intertwined with each other, and cross over at one intersection per pair of transmitting and receiving electrodes. In FIG. 10, the jump locations are illustrated by dots at the location of vias that jump the receiving electrodes 1004 to another layer (not shown), where they are ohmically connected to provide electrical continuity for the entire receiving electrode.

In such an embodiment, the deflectable electrode layer can be disposed proximate to the sensor electrodes in any location where it will impact the measure of transcapacitance when deflected toward the sensor electrodes.

A family of related electrode designs 1100 is illustrated in FIG. 11. Each of these designs illustrates a sensor cell representing a single crossing transmitter sensor electrode 1102 and a receiver sensor electrode 1104. In each of these variations the designs can improve the transcapacitive measurement. The number of segments in the spiral pattern can be increased or decreased, being dependent upon the desired design and design constraints or advantages. Alternatively, rather than being composed of discrete straight segments, the spiral pattern can be formed as a continuous smooth curve or as any combination of straight and curved sections. In each of the embodiments shown, the sensor electrodes may be formed at a uniform width, or may comprise extremely fine wires or other conductive material in transparent touch screens. Alternatively, the width of the sensor electrodes can be thinned at the crossings to avoid excessive transcapacitance between the crossing sensor electrodes.

Figure 12:
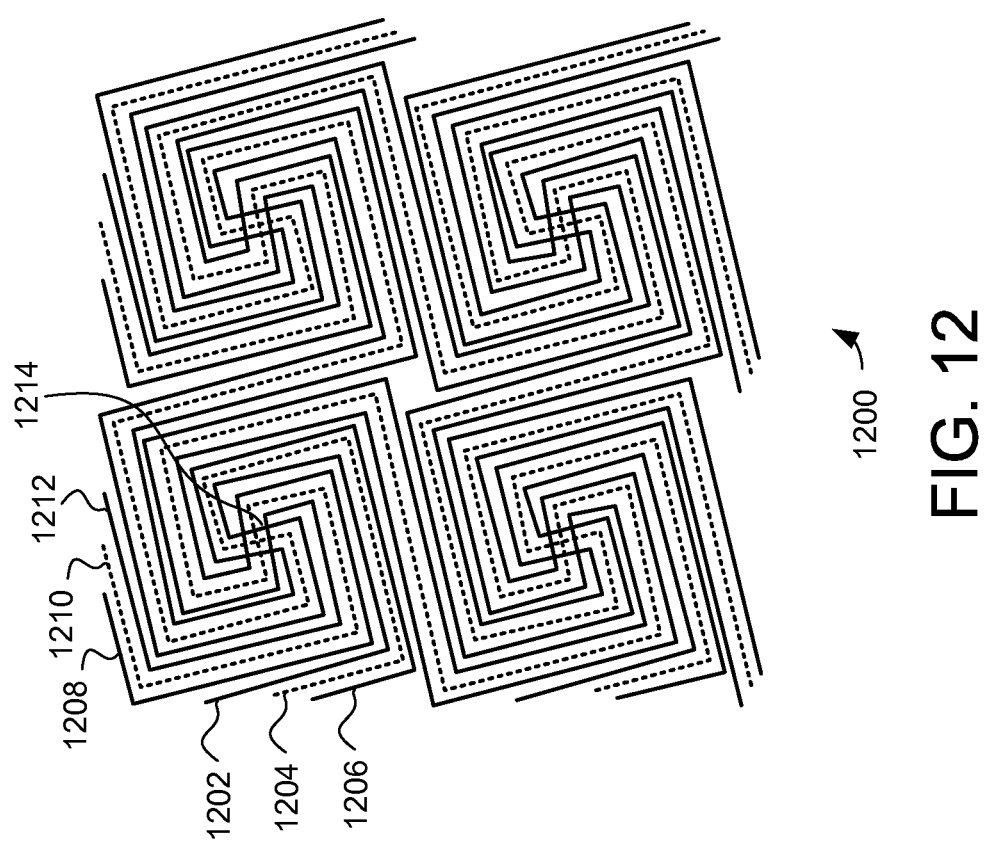

Another embodiment is shown in FIG. 12. In this embodiment, the sensor electrodes 1200 include a first set of three sensor electrodes 1202, 1204, 1206 disposed along a first axis and second set of three sensor electrodes 1208, 1210, 1212 disposed along a second axis in an intertwined double spiral design. These two sets of sensor electrodes comprise a first set of sensing electrodes (e.g., transmitting) and the second set of sensing electrodes (e.g., receiving) respectively. In this embodiment, the first set of sensor electrodes (e.g. sensor electrodes 1202, 1204, 1206) and the second set of sensor electrodes (e.g. sensor electrodes 1208, 1210, 1212) are grouped in triples and are disposed on opposing faces of an insulating substrate. Other embodiments contemplated can include any number of the first and second sets of sensor electrodes in the electrodes 1200. Yet other embodiments contemplated can include the number of a first set of sensor electrodes being different from the number of a second set of sensor electrodes in electrodes 1200. Grouping sensor electrodes in this manner can allow individual sensor electrodes of the group to be arbitrarily narrow relative to the size of the spiral, which may be desirable for reasons including, and not limited to: cost, ease of manufacture, availability of fabrication expertise or equipment, availability of material and components, and specific sensor design. For example, one may want to design a touch sensor which glows, or a touch screen through which a display can be viewed. One desirable property of a grouping of thin sensor electrodes is to enable the overall trace matrix to pass light around individual sensor electrodes, while still allowing the group as a whole to have sufficient surface area to achieve the desired sensitivity. Of course, the number of first set and second set of sensor electrodes may vary based upon the desired size and shape of the capacitive sensor.

Referring again to FIG. 12, the first set of sensor electrodes 1202, 1204, 1206 and the second set of sensor electrodes 1208, 1210, 1212 are intertwined and the first set of sensor electrodes 1202, 1204, 1206 and the second set of sensor electrodes 1208, 1210, 1212 cross each other at each crossing (e.g., crossing 1214, where one of a first trace 1202 crosses one of a second trace 1208). In this embodiment, electrical contact between the sensor electrodes is prevented by the presence of insulating material between the sensor electrodes. Each crossing (e.g., 1212) of two sensor electrodes (e.g., 1202 and 1208) forms an "x". At each crossing, at least one of the two sensor electrodes 1202 and 1208 may be substantially thinner than the remaining portion of the sensor electrodes 1202 and 1208. Other conventional circuit-board techniques can be utilized at the cross-over location to prohibit electrical contact between the sensor electrodes.

Again, it should be noted that each of the embodiments illustrated in FIGS. 10-12 can be implemented with a variety of different deflectable electrodes. For example, a single deflectable electrode can be implemented to cover all of a significant part of the overall electrode pattern. Such a single deflectable electrode can be implemented with a resistive material and/or have a grid pattern as was discussed above. In other embodiments, an array of deflectable electrodes can be used, with each deflectable electrode disposed over selected portions of the electrode pattern. For example, being disposed over the crossing locations of the electrodes.

Thus, devices and methods are provided that facilitate improved input device performance. The devices and methods utilize at least one transmitter sensor electrode and at least one receiver sensor electrode that are capacitively coupled to form a transcapacitance for capacitively sensing input objects in a sensing region. A measure of the transcapacitance may be used to determine positional information for the input objects in the sensing region. In accordance with the various embodiments, the devices and methods additionally utilize at least one electrically floating deflectable electrode. The deflectable electrode is configured to be deflectable toward the sensor electrodes, where such deflection causes a change in the measured transcapacitance.

The devices and methods may use the deflectable electrode in a variety of ways that facilitate improved input device performance and usefulness. Specifically, the change in the measured transcapacitance resulting from the deflectable electrode can be used to determine information regarding an input object. As one specific example, a magnitude of change in the measure of the transcapacitance may be used to determine pressure information for an input object. As another example, the sign of the change in the measure of transcapacitance may be used to determine the type of input object. For example, the sign of the change in the measure of transcapacitance may be used to distinguish between conductive and nonconductive input objects.

What is claimed is:

1. An input device for capacitively sensing input objects in a sensing region, comprising:
    a set of sensor electrodes comprising:
        a transmitter sensor electrode, and
        a receiver sensor electrode, wherein the transmitter sensor electrode is capacitively coupled to the receiver sensor electrode to form a transcapacitance;
    a first deflectable electrode and a second deflectable electrode overlapping at least a portion of the set of sensor electrodes,
        wherein the first deflectable electrode is separated by an insulator from the second deflectable electrode,
        wherein the first deflectable electrode is configured, when capacitively coupled with an input object, to produce an electrical ground in the input device,
        wherein the insulator is configured to prevent a grounding effect at the second deflectable electrode when the second deflectable electrode is not capacitively coupled with the input object, and
        wherein deflection of the first deflectable electrode and the second deflectable electrode toward the set of sensor electrodes is configured to cause a change in the transcapacitance; and
    a deformable layer overlapping the set of sensor electrodes and configured to facilitate the change in the transcapacitance in response to a pressure applied by the input object to the first deflectable electrode, and
    wherein the change in the transcapacitance corresponds to an amount of pressure applied by the input object to the first deflectable electrode.

2. The input device of claim 1 further comprising a processing system coupled to the set of sensor electrodes, the processing system configured to determine a measure of the transcapacitance, the processing system further configured to determine positional information for the input object in the sensing region from the measure of the transcapacitance.

3. The input device of claim 1 further comprising a processing system coupled to the set of sensor electrodes, the processing system configured to determine a measure of the transcapacitance, the processing system further configured to determine pressure information for the input object causing deflection of the first deflectable electrode, wherein the pressure information is based upon a magnitude of a change in the measure of the transcapacitance.

4. The input device of claim 1 further comprising a processing system coupled to the set of sensor electrodes, the processing system configured to determine a measure of the transcapacitance, the processing system further configured to determine a type of the input object based upon a sign of a change in the measure of the transcapacitance.

5. The input device of claim 4 wherein the type of the input object includes conductive objects and nonconductive objects such that the processing system is configured to distinguish between a conductive object and a nonconductive object based upon the sign of the change in the measure of the transcapacitance.

6. The input device of claim 3 further comprising an insulating layer between the first deflectable electrode and the set of sensor electrodes.

7. The input device of claim 3 further comprising at least one gap between the first deflectable electrode and the set of sensor electrodes.

8. An input device for capacitively sensing input objects in a sensing region, comprising:
    a set of sensor electrodes comprising:
        a transmitter sensor electrode, and
        a receiver sensor electrode, wherein the transmitter sensor electrode is capacitively coupled to the receiver sensor electrode to form a transcapacitance;
    a substrate; and
    a first deflectable electrode and a second deflectable electrode disposed on a surface of the substrate,
        wherein the first deflectable electrode is separated by an insulator from the second deflectable electrode,
        wherein the first deflectable electrode is configured, when capacitively coupled with an input object, to produce an electrical ground in the input device,
        wherein the insulator is configured to prevent a grounding effect at the second deflectable electrode when the second deflectable electrode is not capacitively coupled with the input object,
        wherein deflection of the first deflectable electrode and the second deflectable electrode toward the set of sensor electrodes is configured to cause a change in the transcapacitance,
        wherein the first substrate comprises a deformable layer overlapping the set of sensor electrodes, the deformable layer being configured to facilitate the change in the transcapacitance in response to a pressure applied by the input object to the first deflectable electrode, and
        wherein the change in the transcapacitance corresponds to an amount of pressure applied by the input object to the first deflectable electrode.

9. The input device of claim 8 further comprising a processing system coupled to the set of sensor electrodes, the processing system configured to determine a measure of the transcapacitance, the processing system further configured to determine positional information for the input object in the sensing region from the measure of the transcapacitance.

10. The input device of claim 8 further comprising a processing system coupled to the set of sensor electrodes, the processing system configured to determine a measure of the transcapacitance, the processing system further configured to determine pressure information for the input object causing deflection of the first deflectable electrode, the pressure information based upon a magnitude of a change in the measure of the transcapacitance.

11. The input device of claim 8 further comprising a processing system coupled to the set of sensor electrodes, the processing system configured to determine a measure of the transcapacitance, the processing system further configured to determine a type of input object based upon a sign of a change in the measure of the transcapacitance.

12. The input device of claim 11 wherein the type of the input object includes conductive objects and nonconductive objects such that the processing system is configured to distinguish between a conductive object and a nonconductive object based upon the sign of the change in the measure of the transcapacitance.

13. The input device of claim 10 wherein the first deflectable electrode comprises a printed material.

14. The input device of claim 10 wherein the first deflectable electrode comprises a patterned material.

15. The input device of claim 14 wherein the first deflectable electrode is patterned using a lithographic process.

16. The input device of claim 10 further comprising an insulating layer between the first deflectable electrode and the set of sensor electrodes.

17. The input device of claim 10 further comprising at least one gap between the first deflectable electrode and the set of sensor electrodes.

18. The input device of claim 10 wherein the first deflectable electrode overlaps at least a portion of the set of sensor electrodes.

19. An input device for capacitively sensing input objects in a sensing region, comprising:
   a set of sensor electrodes comprising:
      a set of transmitter sensor electrodes; and
      a set of receiver sensor electrodes, wherein each transmitter sensor electrode in the set of transmitter sensor electrodes is capacitively coupled to at least one receiver sensor electrode in the set of receiver sensor electrodes to form a set of transcapacitances; and
   a first deflectable electrode and a second deflectable electrode that overlaps at least a portion of the set of sensor electrodes,
      wherein the first deflectable electrode is separated by an insulator from the second deflectable electrode,
      wherein the first deflectable electrode is configured, when capacitively coupled with an input object, to produce an electrical ground in the input device,
      wherein the insulator is configured to prevent a grounding effect at the second deflectable electrode when the second deflectable electrode is not capacitively coupled with the input object, and
      wherein deflection of the first deflectable electrode and the second deflectable electrode toward the set of sensor electrodes is configured to cause a change in at least one of the set of transcapacitances;
   a deformable layer overlapping the set of sensor electrodes and configured to facilitate the change in the at least one of the set of transcapacitances in response to a pressure applied by the input object to the first deflectable electrode; and
   a processing system coupled to the set of sensor electrodes and configured to determine measures of the set of transcapacitances, the processing system further configured to determine positional information for the input object in the sensing region based on the measures of the set of transcapacitances, and
   determine pressure information for the input object applying pressure to the first deflectable electrode, the pressure information based upon a magnitude of the change in at least one of the measures of the set of transcapacitances.

20. The input device of claim 19 wherein the processing system is further configured to determine pressure information for the input object by identifying a change in the magnitude of at least one of the measures of the set of transcapacitances beyond a baseline.

21. The input device of claim 19 wherein the processing system is further configured to distinguish between a conductive object and a nonconductive object based upon a sign of the change in at least one of the measures of the set of transcapacitances.

22. The input device of claim 21 wherein the processing system is further configured to distinguish between the conductive object and the nonconductive object by identifying the conductive object in response to a decrease in at least one of the measures of the set of transcapacitances and by identifying the nonconductive object in response to an increase in at least one of the measures of the set of transcapacitances.

23. The input device of claim 19 wherein the first deflectable electrode comprises a resistive material.

24. A method for determining user input on a device, comprising:
   driving signals onto a set of transmitter sensor electrodes in the device;
   receiving, while an input object capacitively couples with a first deflectable electrode, signals on a set of receiver sensor electrodes in the device,
      wherein the first deflectable electrode is separated by an insulator from a second deflectable electrode,
      wherein the first deflectable electrode produces an electrical ground in the device,
      wherein the insulator prevents a ground effect at the second deflectable electrode when the second deflectable electrode is not capacitively coupled with the input object,
      wherein deflection of the first deflectable electrode toward the set of transmitter sensor electrodes causes a change in at least one of a set of transcapacitances, and
      further wherein a deformable layer overlaps the sets of transmitter and receiver sensor electrodes, the deformable layer being configured to facilitate the change in the at least one of the set of transcapacitances in response to a pressure applied by the input object to the first deflectable electrode;
   determining a measure of the set of transcapacitances from the received signals, wherein the measure of the set of transcapacitances corresponds to the pressure applied to the first deflectable electrode;
   determining, from the measure of the set of transcapacitances, a magnitude of change in the set of transcapacitances, wherein the magnitude of change satisfies a predetermined threshold level; and
   determining an amount of pressure applied by the input object to the first deflectable electrode based on the magnitude of change.

25. The method of claim 24 wherein the at least one deflectable electrode overlaps at least one of the transmitter sensor electrodes and at least one of the receiver sensor electrodes.

26. The method of claim 24 wherein the at least one deflectable electrode comprises a plurality of deflectable electrodes, and wherein each deflectable electrode in the plurality of deflectable electrodes overlaps one of the transmitter sensor electrodes and one of the receiver sensor electrodes.

27. The method of claim 24 further comprising the steps of:
   determining positional information for an input object causing deflection of the first deflectable electrode, wherein the positional information is based upon the change in the at least one of the set of transcapacitances; and
   providing an output representative of the positional information.

28. The method of claim 27 wherein the step of determining positional information comprises determining the magnitude of the change by comparing the change to a baseline.

29. The method of claim 24 further comprising the steps of:
  distinguishing between a conductive object and a nonconductive object based upon a sign of a change in the measure of the set of transcapacitances to determine an object type; and
  providing an output representative of the object type.

30. The method of claim 29 wherein the step of distinguishing between a conductive object and a nonconductive object comprises identifying a conductive object in response to a decrease in at least one of the measure of the set of transcapacitances and identifying a nonconductive object in response to an increase in the measure of the set of transcapacitances.

31. A processing system configured to:
  drive signals onto a set of transmitter sensor electrodes in an input device;
  receive, while an input object capacitively couples with a first deflectable electrode, signals on a set of receiver sensor electrodes in the input device,
    wherein the first deflectable electrode is separated by an insulator from a second deflectable electrode,
    wherein the first deflectable electrode produces an electrical ground in the input device,
    wherein the insulator prevents a ground effect at the second deflectable electrode when the second deflectable electrode is not capacitively coupled with the input object,
    wherein deflection of the first deflectable electrode toward the set of transmitter sensor electrodes causes a change in at least one of a set of transcapacitances, and
    further wherein a deformable layer overlaps the sets of transmitter and receiver sensor electrodes, the deformable layer being configured to facilitate the change in the at least one of the set of transcapacitances in response to a pressure applied by the input object to the first deflectable electrode;
  determine a measure of the set of transcapacitances from the received signals, wherein the measure of the set of transcapacitances corresponds to the pressure applied to the at least one deflectable electrode;
  determine, from the measure of the set of transcapacitances, a magnitude of change in the set of transcapacitances, wherein the magnitude of change satisfies a predetermined threshold level; and
  determine an amount of pressure applied by the input object to the at least one deflectable electrode based on the magnitude of change.

32. The processing system of claim 31 further configured to:
  determine positional information for the input object causing deflection of the first deflectable electrode, wherein the positional information is based upon the change in the at least one of the set of transcapacitances; and
  provide an output representative of the positional information.

33. The processing system of claim 32 further configured to:
  determine the magnitude of the change by comparing the change to a baseline.

34. The processing system of claim 32 further configured to:
  distinguish between a conductive object and a nonconductive object based upon a sign of a change in the measure of the set of transcapacitances to determine an object type; and
  provide an output representative of the object type.

* * * * *